United States Patent
Rollins et al.

(10) Patent No.: US 7,764,732 B2
(45) Date of Patent: Jul. 27, 2010

(54) ADAPTIVE ERROR SLICER AND RESIDUAL INTERSYMBOL INTERFERENCE ESTIMATOR

(75) Inventors: Mark Edward Rollins, Stittsville (CA); John Duncan McNicol, Ottawa (CA)

(73) Assignee: Applied Micro Circuits Corporation, San Diego, CA (US)

( * ) Notice: Subject to any disclaimer, the term of this patent is extended or adjusted under 35 U.S.C. 154(b) by 684 days.

(21) Appl. No.: 11/800,832

(22) Filed: May 8, 2007

(65) Prior Publication Data
US 2007/0258517 A1 Nov. 8, 2007

Related U.S. Application Data

(60) Provisional application No. 60/798,328, filed on May 8, 2006.

(51) Int. Cl.
*H03H 7/30* (2006.01)
(52) U.S. Cl. .................................................. 375/233
(58) Field of Classification Search ................. 375/233
See application file for complete search history.

(56) References Cited

U.S. PATENT DOCUMENTS 7,292,661 B1 * 11/2007 Chan et al. ................. 375/346

2005/0025229 A1 * 2/2005 Jones et al. ................. 375/232

OTHER PUBLICATIONS

Shahid Qureshi, "Adaptive Equalization", Proceedings og the IEEE, vol. 73, No. 9, Sep. 1985.
Jack Winters et al., "Electrical Signal Processing Techniques in Long-Haul Fiber-Optic Systems", IEEE Transactions on Communications, vol. 38, No. 9, Sep. 1990.

* cited by examiner

*Primary Examiner*—Shuwang Liu
*Assistant Examiner*—Michael R Neff
(74) *Attorney, Agent, or Firm*—Law Office of Gerald Maliszewski; Gerald Maliszewski

(57) ABSTRACT

Conventional adaptive equalizers often use the "sign/sign" algorithm as a low complexity means to adjust their tap weight coefficients by driving the correlation between its single-bit "error" and "data" signals to zero. This algorithm fails in the presence of strong residual intersymbol interference (ISI), since this ISI renders the "error" signal sufficiently inaccurate to mask the correlation between "data" and "error". Failure manifests itself two-fold as an inability to achieve tap weight acquisition at startup, and an inability to track dynamic channel conditions. The invention described herein employs an adaptive estimator to compute the residual masking ISI terms that in turn control an adaptive error slicer to synthesize a modified single-bit "error" signal that remains correlated with the "data" signal. By restoring this correlation between "error" and "data" using these two modifications, the "sign/sign" algorithm retains its acquisition and tracking capabilities in the presence of strong residual ISI.

20 Claims, 16 Drawing Sheets

ADAPTIVE ERROR SLICER AND RESIDUAL INTERSYMBOL INTERFERENCE ESTIMATOR

RELATED APPLICATIONS

The present Application for Patent claims priority to Provisional Application No. 60/798,328, entitled, ADAPTIVE ERROR SLICER AND RESIDUAL INTERSYMBOL INTERFERENCE ESTIMATOR, filed May 8, 2006, and assigned to the assignee hereof and hereby expressly incorporated by reference herein.

FIELD OF THE INVENTION

The present invention relates to the reliable transmission and reception of digital signals over dispersive transmission media, and in particular to transmission systems employing adaptive equalization for compensation of signal distortions introduced by propagation over such media.

BACKGROUND OF THE INVENTION

Many communication systems employ adaptive equalization to mitigate the impact of signal distortions introduced by propagation over dispersive media. Examples include telephone and radio channels, and 10 Gbps multi-mode fiber-optic systems found in emerging Ethernet local area networks (LANs). The predominant impairment to reliable communication over these channels is intersymbol interference (ISI). Equalization employs both linear and non-linear signal processing techniques to remove the effects of ISI. Equalizers operate adaptively in practice to cope with the time varying nature of many dispersive media.

Class of Equalizer

Practical systems often use maximum likelihood sequence estimation (MLSE), a feedforward equalizer (FFE) or transversal filter, or a form of a decision-feedback equalizer (DFE) to perform conventional adaptive equalization. MLSE, FFE or DFE may be used in both low rate and high rate applications. Typically, the FFE is not a preferred choice due to noise-enhancement issues for heavily dispersive media. Although the performance of MLSE is optimal and can exceed that of the DFE, its complexity often limits its use to low rate applications such as voice-band modems. The DFE represents the preferred choice in high rate systems such as 10 Gbps fiber-optic LANs where high power consumption renders MLSE impractical.

Class of Implementation

Common architectures for a DFE may be classified into three classes of implementation based on which technology is selected for the data path and control: (i) discrete-time architecture, (ii) continuous-time architecture, and (iii) hybrid architecture.

The discrete-time architecture uses a sampled data approach to convert the distorted input continuous-time (analog) waveform to a sampled discrete-time signal, typically using a high-resolution analog-to-digital converter (ADC). The full data path and control elements of the DFE are then implemented in digital hardware or perhaps in software on a digital signal processor, depending on the data rate of the application. The high power consumption of this approach renders it unattractive for 10 Gbps fiber-optic LANs, and impractical for systems using low-power and low-cost optical modules.

The continuous-time DFE architecture implements the data path and control elements in analog circuitry. A pure analog solution is sensitive to DC offsets due to device mismatch, process & temperature variations, and data path latency mismatches, all of which are difficult to manage robustly. Moreover, the bandwidth of the control circuitry required is nearly three orders of magnitude lower than the line rate for 10 Gbps fiber-optic LANs. Analog implementations of these low bandwidth control loop filters require large off-chip capacitors, leading to increased cost and board area. Alternately, high bandwidth loop filters using smaller on-chip capacitors may be used but this leads to increased power consumption of the control portion of the architecture.

The hybrid architecture uses high bandwidth analog circuitry to implement the data path and low-rate digital circuitry to implement the control portion of the DFE. This hybrid architecture is well suited to for 10 Gbps fiber-optic LANs as it eliminates most of the drawbacks outlined above for the discrete-time and continuous-time architectures outlined above.

Class of Tap Weight Optimization

Conventional equalizers employ coefficients or "tap weights" to adjust their response to compensate for that of the unknown transmission medium. An adaptive mechanism often provides a means to optimize these tap weights autonomously. This practice is useful not only for unknown channels but also to compensate for variations in device characteristics over time such as temperate and device aging.

The minimum mean square error (MMSE) and zero-forcing (ZF) criteria represent the two most popular approaches for tap weight adjustment. The least mean square (LMS) algorithm provides an adaptive solution to solving the MMSE problem by moving the weights in the direction dictated by a noisy estimate of the actual gradient vector for the underlying squared error surface. An adaptive solution for the ZF problem uses a similar approach, albeit with a slightly different formulation of the cost function.

Reduced complexity variants of the adaptation algorithms for both the MMSE and ZF criteria are well known and have similar structure. A generic class of "sign/sign" algorithms employs single-bit representations of the "data" and "error" input signals used by the adaptation algorithms to achieve acceptable performance with low implementation complexity.

Conventional ZF-DFE With Sign/Sign Adaptation

This section outlines the prior art required to implement a zero-forcing decision feedback equalizer with sign/sign adaptation.

Channel Impulse Response

The design of a conventional ZF-DFE is tailored to the channel impulse response to be equalized. For simplicity of description, FIG. 1(a) shows the discrete time samples of a typical channel impulse response. The composite "channel" represents the cascade of all system filtering effects, including the impulse responses of the transmit pulse shaping, the transmission medium, and any front-end receiver filtering up to the input of the ZF-DFE.

The channel impulse response introduces ISI to the desired symbol from post-cursor components contributed by past symbols, and pre-cursor components originating from future symbols yet to be transmitted. FIG. 1(a) shows a channel impulse response with L post-cursor symbols, and F pre-cursor symbols. The total span of L+F, along with the specific frequency domain response determined by the channel coefficients $\{h_{-L},\ldots,h_{-1},h_0,h_1,\ldots,h_F\}$ influence the complexity of the conventional ZF-DFE required for equalizing such a response.

ZF-DFE Architecture & Operation

A block diagram of the conventional ZF-DFE is shown in FIG. 2. The architecture consists of "data path" and "control" elements, The "data path" consists of the FFE DATA PATH 100, DFE DATA PATH 101 and DATA SLICER 102, and serves to cancel the pre-cursor ISI, post-cursor ISI, and make a final data decision. The "control" elements consist of the ERROR SLICER 103, FFE CORRELATORS 104 and DFE CORRELATORS 105, and serve to determine adaptively two sets of tap weights $\{f_0,\ldots,f_F\}$ for the FFE DATA PATH 100 and $\{b_1,\ldots,b_B\}$ for the DFE DATA PATH 101 that optimize the cancellation of ISI by the data path.

The FFE DATA PATH 100 processes the input signal with a linear transversal filter to remove the pre-cursor ISI contained therein. FIG. 3 provides a detailed diagram of the block. The tap weights $\{f_0,\ldots,f_F\}$ of the filter provide (1+F) degrees of freedom by which the zero-forcing criterion may modify the channel impulse response to cancel the pre-cursor ISI samples. FIG. 1(b) shows that pre-cursor samples $\{h_1,\ldots,h_F\}$ of the original channel impulse response from FIG. 1(a) are now zero-valued at the output of the filter, and the post-cursor response has been modified from samples $\{h_{-1},\ldots,h_{-L}\}$ to samples $\{b_1,\ldots,b_B\}$. The FFE CORRELATORS 104 determines the values of the tap weights $\{f_0,\ldots,f_F\}$ using an adaptive algorithm outlined below.

The output of the FFE DATA PATH 100 may be described mathematically as follows. Assume the sequence of data symbols $\{\ldots,d_{k-1},d_k,d_{k+1},\ldots\}$ was sent over the transmission medium. Since all pre-cursor ISI is cancelled by the application of tap weights $\{f_0,\ldots,f_F\}$, then according to the equivalent impulse response shown in FIG. 1(b) the signal $y_k$ at the output of the FFE DATA PATH 100 is given by:

$$y_k = d_k + \sum_{n=1}^{B} d_{k-n} \cdot b_n. \qquad \text{(Eq. 1)}$$

The first term in (Eq. 1) is the desired symbol $d_k$ and the second term represents the post-cursor ISI that remains uncancelled.

The DATA SLICER 102 performs a memoryless slicing operation against zero to determine the detected symbols decisions $\{\ldots,\hat{d}_{k-1},\hat{d}_k,\hat{d}_{k+1},\ldots\}$ corresponding to the transmitted symbols $\{\ldots,d_{k-1},d_k,d_{k+1},\ldots\}$. Decision errors are made when the detected symbol $\hat{d}_k$ is not equal to transmitted symbol $d_k$.

The DFE DATA PATH 101 processes the output of the DATA SLICER 102, using its sequence of past data decisions to synthesize an estimate of the post-cursor ISI that remains at the output of the FFE DATA PATH 100. This ISI estimate is then subtracted away leaving the input to the DATA SLICER 102 free from ISI. FIG. 4 provides a detailed diagram of the block. The equivalent impulse response samples $\{b_1,\ldots,b_B\}$ from FIG. 1(b) form the tap weights of a transversal filter operating on input sequence $\{\ldots,\hat{d}_{k-1},\hat{d}_k,\hat{d}_{k+1},\ldots\}$ to synthesize the following estimate $r_k$ of the post-cursor ISI:

$$r_k = \sum_{n=1}^{B} \hat{d}_{k-n} \cdot \hat{b}_n \qquad \text{(Eq. 2)}$$

The DFE CORRELATORS 105 produces the estimates $\{\hat{b}_1,\ldots,\hat{b}_B\}$ in (Eq. 2) of the post-cursor impulse response coefficients $\{b_1,\ldots,b_B\}$ using an adaptive algorithm outlined below.

The DATA SLICER 102 performs a memoryless slicing operation against zero to determine the detected symbols decisions $\{\ldots,\hat{d}_{k-1},\hat{d}_k,\hat{d}_{k+1},\ldots\}$ corresponding to the transmitted symbols $\{\ldots,d_{k-1},d_k,d_{k+1},\ldots\}$. Decision errors are made when the detected symbol $\hat{d}_k$ is not equal to transmitted symbol $d_k$. During normal system operation where the bit error rate (BER) is low, the output decisions $\hat{d}_k$ equal the transmitted symbols $d_k$. If follows that when the DFE tap weights $\{\hat{b}_1,\ldots,\hat{b}_B\}$ approximate closely the impulse response coefficients $\{b_1,\ldots,b_B\}$, the DATA SLICER 102 input signal $z_k$ is nearly devoid of post-cursor ISI:

$$z_k = d_k + \sum_{n=1}^{B} d_{k-n} \cdot b_n - \sum_{n=1}^{B} \hat{d}_{k-n} \cdot \hat{b}_n \approx d_k \qquad \text{(Eq. 3)}$$

The result in (Eq. 3) shows mathematically how the ZF-DFE uses the FFE DATA PATH 100 and DFE DATA PATH 101 to process the input signal and cancel its pre-cursor and post-cursor ISI. FIG. 1(c) shows the same result in terms of the equivalent impulse response of the system, seen from the transmitter through to the input to the DATA SLICER 102.

ZF Tap Weight Adaptation

The ERROR SLICER 103, DFE CORRELATORS 105 and FFE CORRELATORS 104 of FIG. 2 form the control portion of the ZF-DFE responsible for computing adaptively the tap weights $\{f_0,\ldots,f_F\}$ and $\{b_1,\ldots,b_B\}$ required by the data path to mitigate the ISI. The "zero-forcing" algorithm drives the tap weights towards their optimal settings by driving the residual correlation between the outputs of the "error" and "data" signals to zero.

The DATA SLICER 102 produces the "data" signal input to the correlators as outlined above by making memoryless decisions $\{\hat{d}_k\}$ on the transmitted data. The "error" signal input to the correlators represents the difference between the DATA SLICER 102 input signal $z_k$ and output signal $\hat{d}_k$, and is produced by the ERROR SLICER 103.

FIG. 5 shows a block diagram of the internal details of the FFE CORRELATORS 104 of FIG. 2. The "data" input enters shift register 104d, and the "error" input enters shift register 104e. The length of each shift register is identical and matches the total span of the equalizer shown in FIG. 1(b), or a total of (1+F+B) symbols. The outputs of cells 104d(0) through 104d(F−1) form inputs to a bank of TAP CORRELATOR blocks 104-0 through 104-(F). Output signal sd(0) from cell 104d(0) forms the first input to TAP CORRELATOR 104-0, output signal sd(1) from cell 104d(1) forms the first input to TAP CORRELATOR 104-1, and so on, such that output-signal sd(F−1) forms the first input to TAP CORRELATOR 104-(F−1). The. "data" input signal forms the first input to TAP CORRELATOR 104-(F). The second input signal of all TAP CORRELATOR blocks, signal se(0), is taken from the output of cell 104e(0) from shift register 104e. TAP CORRELATOR 104-0 produces tap weight $f_0$ for the FFE DATA PATH 100 of FIG. 2 TAP CORRELATOR 104-1 produces tap weight $f_1$, and so on, such that TAP CORRELATOR 104-(F) produces tap weight $f_F$. All TAP CORRELATOR blocks are identical, but are simply driven by different inputs on the first port.

FIG. 6 shows a block diagram of the internal details of the DFE CORRELATORS 105 of FIG. 2. The "data" input enters shift register 105*d*, and the "error" input enters shift register 105*e*. The length of each shift register is identical and matches the total span of the equalizer shown in FIG. 1(*b*), or a total of (1+F+B) symbols. The outputs of cells 105*d*(−1) through 105*d*(−B) form inputs to a bank of TAP CORRELATOR blocks 105-1 through 105-(B). Output signal sd(−1) from cell 105*d*(−1) forms the first input to TAP CORRELATOR 105-1, output signal sd(−2) from cell 105*d*(−2) forms the first input to TAP CORRELATOR 105-2, and so on, such that output signal sd(−B) form cell 105*d*(−B) forms the first input to TAP CORRELATOR 105-(B). TAP CORRELATOR 105-1 produces tap weight $b_1$ for the DFE DATA PATH 101 of FIG. 2, TAP CORRELATOR 105-2 produces tap weight $b_2$, and so on, such that TAP CORRELATOR 105-(B) produces tap weight $b_B$. All TAP CORRELATOR blocks are identical, but are simply driven by different inputs on the first port.

The conventional ZF tap weight adaptation algorithm for updating the FFE tap weights based on the data and error input signals identified above is given by the following recursive equation:

$$f_{n,k+1} = f_{n,k} - \mu \cdot e_k \cdot d_{k+n}. \quad \text{(Eq. 4)}$$

In (Eq. 4), the index n runs through the tap weights $\{f_0, \ldots, f_F\}$ from 0 to F, the tap weights have been given an additional suffix k and k+1 to denote time. The step size parameter $\mu$ controls the convergence rate of the algorithm.

The conventional ZF tap weight adaptation algorithm for updating the DFE tap weights based on the data and error input signals identified above is given by the following recursive equation:

$$b_{n,k+1} = b_{n,k} + \mu \cdot e_k \cdot d_{k-n}. \quad \text{(Eq. 5)}$$

In (Eq. 5), the index n runs through the tap weights $\{b_1, \ldots, b_B\}$ from 1 to B.

Sign/Sign Tap Weight Adaptation

The tap update equations of (Eq. 4) and (Eq. 5) may be implemented in analog or digital circuitry. For 10 Gbps fiber-optic LAN applications where the channel dynamics vary orders of magnitude slower than the line rate, the tap updates can be performed digitally with much lower power. Since a data path implemented in analog circuitry provides the "error" and "data" inputs in this application, some form of high-speed ADC is required to convert these inputs to digital form. This approach becomes cost and power prohibitive if a high-resolution ADC is required to supply the full precision samples of "error" and "data" inputs dictated by the multiplication shown in (Eq. 4) and (Eq. 5).

The conventional approach to avoiding the cost and power drawbacks of a high-resolution ADC for these tap weight updates in high rate applications such as fiber-optic LANs is to use the "sign/sign" algorithm. Essentially, the high resolution ADC is replaced with a single-bit resolution ADC. Only the "sign bit" of the tap correlator inputs is retained for the computations as shown for the FFE tap weights in the following equation:

$$f_{n,k+1} = f_{n,k} - \mu \cdot sgn(e_k) \cdot sgn(d_{k+n}). \quad \text{(Eq. 6)}$$

In binary systems where the data is antipodal, $sgn(d_k) = d_k$, so this has no impact. But the error term in (Eq. 6) is now quantized to a single bit, reducing the implementation complexity from a high resolution ADC to a single high-speed comparator circuit.

A block diagram of the "sign/sign" TAP CORRELATOR block is shown in FIG. 7.

Deficiency of "Sign/Sign" Algorithm and Residual ISI Problem

This section outlines the deficiency of the "sign/sign" adaptation algorithm in the presence of strong residual ISI.

Source of Residual ISI

In many applications, the span of the equalizer does not fully cover the length of the channel impulse response. Most often this situation occurs due to cost and power consumption constraints. It is always desirable to build a longer equalizer, but this is not always practical.

One example of this occurs in 10 Gbps fiber-optic LANs where the channel impulse response can span upwards of 4 to 7 symbol periods. In these cases, the span of the pre-cursor ISI may be 3 or more symbols in length. Building large on-chip transversal filters of the type shown in FIG. 3 becomes extremely difficult and costly at these lengths, requiring more than 3 mm of on-chip transmission line and bulky on-chip inductors. Similarly, the span of post-cursor ISI may be of similar length. Long tapped delay lines of the type shown in FIG. 4 also become costly in power consumption and complexity due to high rate clock distribution and load matching issues.

FIG. 8 quantifies the channel impulse response and equalizer parameters for a generic system with residual ISI. FIG. 8(*a*) shows a channel impulse response with total span of (L+F+A) symbols. The pre-cursor portion spans (F+A) symbols, which exceeds the span F of the FFE DATA PATH 100 by A symbols. With only (1+F) degrees of freedom to cancel the pre-cursor ISI, the FFE DATA PATH 100 can only cancel the closest F symbols leaving A residual ISI symbols outside its span as shown in FIG. 8(*b*). Furthermore, the span of the channel impulse response at the output of the FFE DATA PATH 100 contains (B+R) symbols of post-cursor ISI, which exceeds the span of B of the DFE DATA PATH 101 by R symbols. The DFE DATA PATH 101 can only cancel the closest B symbols, leaving R residual ISI symbols outside its span as shown in FIG. 8(*c*).

In summary, FIG. 8 shows the result of using a ZF-DFE with an equalizer span that is shorter than the span of the channel impulse response to be equalized. Use the notation (F, B) to denote a ZF-DFE configured to cancel a span of F pre-cursor symbols and a span of B post-cursor symbols. The same notation (F+A,B+R) may be used to denote a channel impulse response with a span of (F+A) pre-cursor symbols and a span of (B+R) post-cursor symbols. Using this notation, FIG. 8 demonstrates the location of the residual pre-cursor and post-cursor ISI samples that result when a (F,B) ZF-DFE is employed over a transmission medium with a (F+A,B+R) channel impulse response.

To clarify further, the signal $z_k$ that drives the input to the DATA SLICER 102 is given by the following equation assuming the operating scenario depicted in FIG. 8:

$$z_k = d_k + \sum_{m=1}^{A} d_{k+F+m} \cdot a_m + \sum_{n=1}^{R} d_{k-B-n} \cdot r_n + \Delta_k, \quad \text{(Eq. 7)}$$

where any residual error resulting from imperfect cancelling of the pre-cursor ISI lying inside the span of the FFE DATA PATH 100, as well as the post-cursor ISI lying inside the span of the FFE DATA PATH 101, is captured by the residual error term $\Delta_k$. As will be shown below, the "sign/sign" adaptation algorithm uses this error term to adjust the tap weights.

Need to Operate Under Residual ISI Conditions

The presence of residual ISI that is not cancelled by a "short" ZF-DFE (ie. with span shorter than the channel impulse response) degrades the error performance of the system by introducing eye closure and increased jitter at the input to the DATA SLICER 102. Indeed, the two summation terms in quantify the eye closure due to residual ISI. This performance degradation is tolerable in many cases. In fact many systems can have sufficient margin in the link budget to operate at their target BER levels with small to moderate amounts of residual ISI. In other scenarios, it is desirable to operate the ZF-DFE at much harsher conditions than the nominal system target. One example is "diversity tracking", where a secondary or "backup" ZF-DFE evaluates candidate tap weight solutions while a "primary" ZF-DFE provides the "in-service" link. The secondary ZF-DFE often sees a significantly larger level of residual ISI than the primary ZF-DFE in these scenarios.

The desire to operate the ZF-DFE under harsh conditions with significant levels of residual ISI leads to the requirement that the "sign/sign" adaptation algorithm must also perform its acquisition and tracking of the tap weights under these same conditions. The ZF-DFE data path cannot operate under these conditions unless its controller supplies an appropriate set of tap weights.

Failure of the Sign/Sign Adaptation Algorithm

The conventional "sign/sign" adaptation algorithm fails in the presence of strong residual ISI due to a masking effect that destroys the correlation between the single-bit "data" and "error" signals. This renders the correlators ineffective at both acquisition and tracking, since there is no useful correlation input from which to drive the tap weights in the proper direction. In effect, the presence of residual ISI produces a "dead zone" in the correlator input.

The impact of this dead zone can be illustrated by considering a simple example. Consider a system with no residual pre-cursor ISI (A=0), one symbol of residual post-cursor ISI (R=1), and a single DFE tap weight (B=1). In this case, the input signal to the DATA SLICER 102 is given by:

$$z_k = d_k + \Delta_k + d_{k-2} r_1. \quad (Eq. 8)$$

In (Eq. 8), the first term is the desired symbol, the second term $\Delta_k = (d_{k-1} b_1 - \hat{d}_{k-1} \hat{b}_1)$ is the residual "error" signal resulting from imperfect zero-forcing cancellation that drives the tap correlator, and the third term is the residual post-cursor ISI. Assuming that the output of the DATA SLICER 102 is correct, the output of the ERROR SLICER 103 is given by:

$$e_k = (d_{k-1} b_1 - \hat{d}_{k-1} \hat{b}_1) + d_{k-2} r_1. \quad (Eq. 9)$$

Under normal operating conditions where $\hat{d}_{k-1} = d_{k-1}$, the first term in (Eq. 9) will be proportional to the tap error $b_1 - \hat{b}_1$ and so its sign will be an accurate reflection of the direction in which the tap correlator must move the tap weight to further reduce the tap error. The sign of the first term also remains correlated with the data term $d_{k-1}$. However, in the presence of residual ISI, we must take the sign of the full (Eq. 9), not just its first term. In this case, the second term is significantly larger than the tap error of the first term. Moreover the data term $d_{k-2}$ is not correlated with $d_{k-1}$ in any way. Both of these effects contribute to a masking of the first term by the second term, leading to the "dead zone" at the input to the correlators mentioned above.

Extending the discussion from the simple case above to the general case of FIG. 8, with an input signal $z_k$ to the DATA SLICER 102 given in (Eq. 7), and assuming that the DATA SLICER 102 $\hat{d}_k = d_k$, the output of the ERROR SLICER 103 is given by:

$$e_k = \Delta_k + \sum_{m=1}^{A} d_{k+F+m} \cdot a_m + \sum_{n=1}^{R} d_{k-B-n} \cdot r_n. \quad (Eq. 10)$$

The two summation terms in (Eq. 10) represent residual pre-cursor and post-cursor ISI that serve to mask the desired error term $\Delta_k$ in the error signal $e_k$. Taking the sign of (Eq. 10) does not provide an accurate approximation to $\Delta_k$ due to the presence of the residual ISI terms. The presence of so many uncorrelated noise terms in the two summation terms creates the "dead-zone" in the general case that was also seen above for the simple case.

BRIEF DESCRIPTION OF THE DRAWINGS

The invention will be further understood from the following description by way of example with reference to the accompanying drawings, in which the same references are used in different figures to denote similar elements and in which.

FIRST EMBODIMENT OF THE INVENTION

Although the conventional "sign/sign" algorithm fails in the presence of residual ISI, its operation can be restored with modifications in according to the embodiment of the invention outlined in this section.

Figure 1:
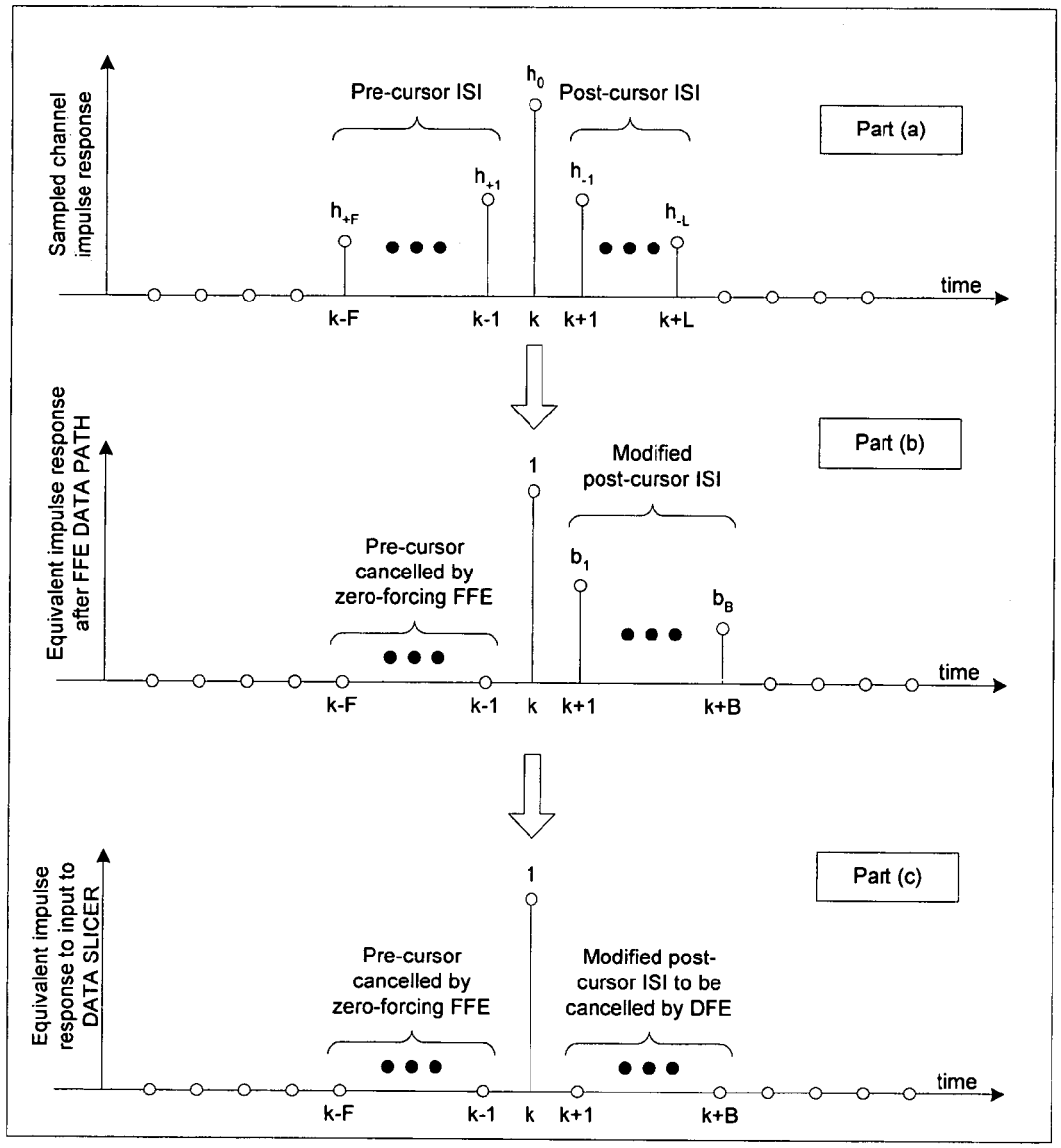
FIG. 1 illustrates operation of a conventional zero-forcing decision-feedback equalizer (ZF-DFE)
Figure 2:
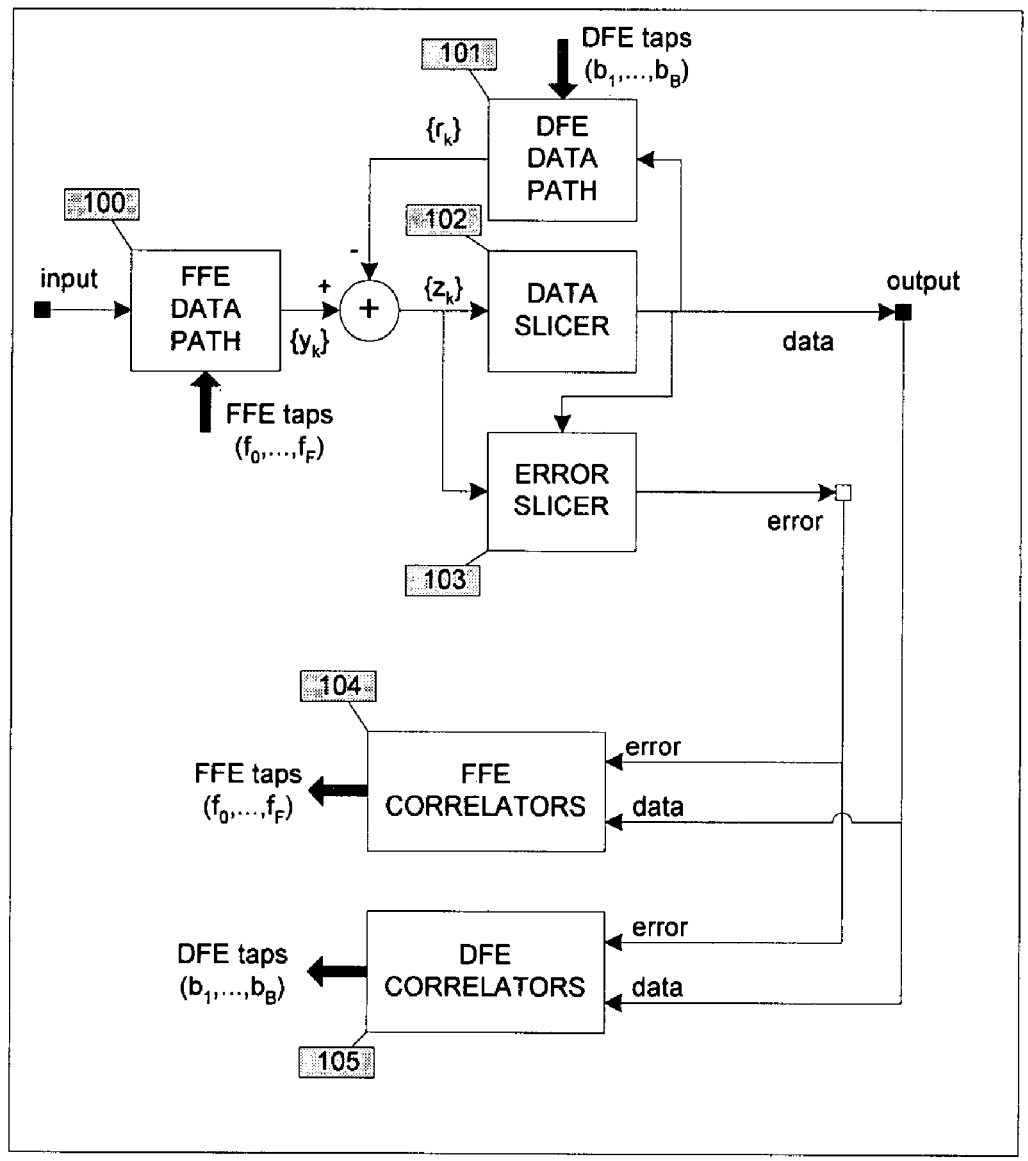
FIG. 2 shows a block diagram of a conventional ZF-DFE.
Figure 3:
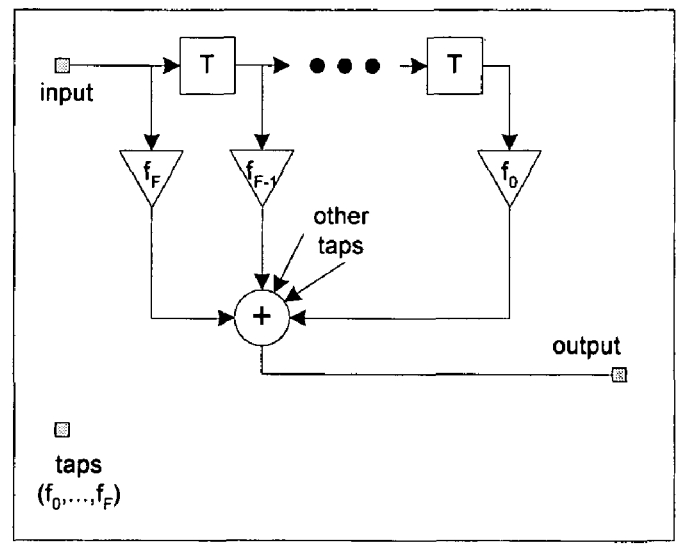
FIG. 3 shows a block diagram of the FFE DATA PATH block of the ZF-DFE of FIG. 2.
Figure 4:
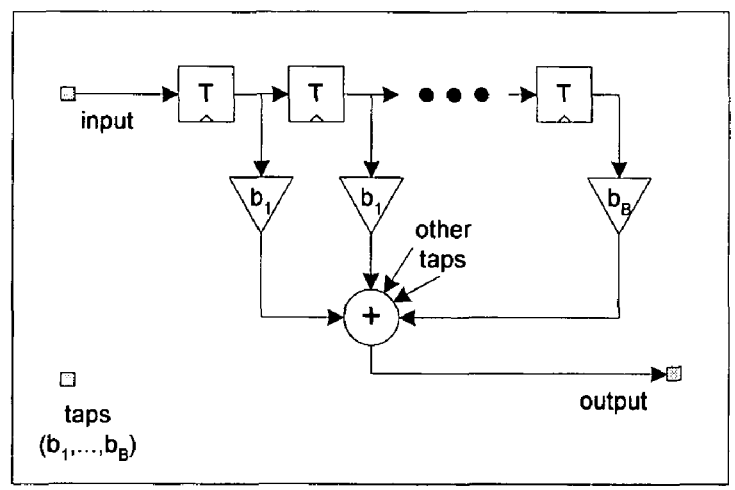
FIG. 4 shows a block diagram of the DFE DATA PATH block of the ZF-DFE of FIG. 2.
Figure 9:
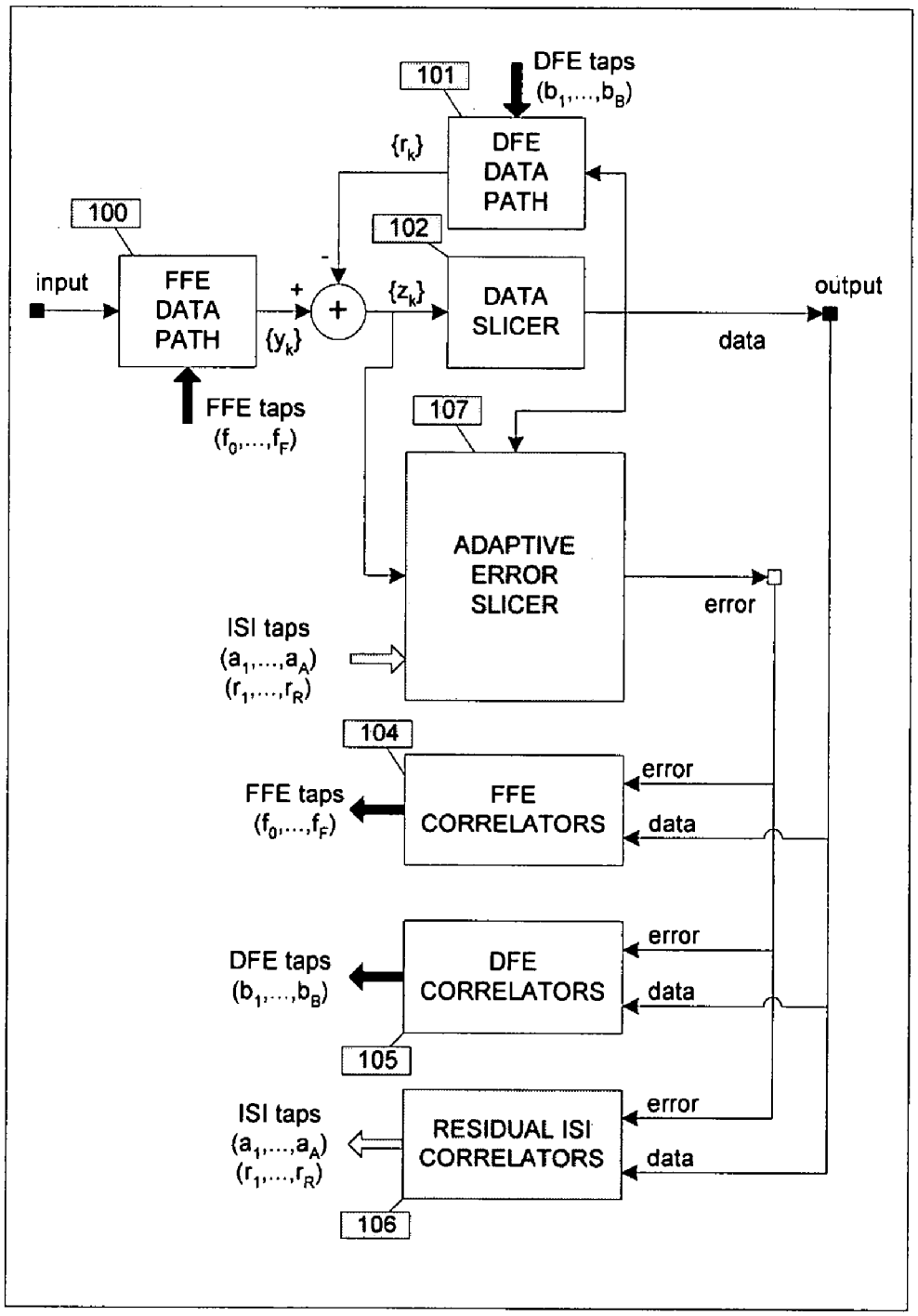
FIG. 9 shows a block diagram of a modified ZF-DFE that represents one possible embodiment of the invention.

FIG. 9 shows a block diagram of a modified ZF-DFE that represents one possible embodiment of the invention. There are two main changes over the conventional system shown in FIG. 2: (i) the ERROR SLICER 103 has been replaced with an ADAPTIVE ERROR SLICER 107, and (ii) RESIDUAL ISI CORRELATORS 106 are included in the modified system. All other blocks in the modified system operate in the same fashion as described earlier for the conventional system.

The underlying concept of the invention can be motivated by a closer examination of the simple system case considered above in (Eq. 8). The residual ISI term $d_{k-2}r_1$ masks the desired tap error, rendering the single-bit sign version of the error inaccurate. However, if this term could be estimated from the input signal, then its effect could be subtracted away leaving only the desired first term. A single-bit approximation to that result would then restore the desired correlation and remove the "dead zone" at the input to the correlators.

Specifically, assume an estimator $\hat{d}_{k-2}\hat{r}_1$ of the residual ISI term $d_{k-2}r_1$ can be made reliably with negligible estimation error. This estimate could then be subtracted from (Eq. 8) to yield a modified error signal $\tilde{e}$ given by:

$$\tilde{e}_k = e_k - \hat{d}_{k-2}\hat{r}_1 = \Delta_k + (d_{k-2}r_1 - \hat{d}_{k-2}\hat{r}_1) \approx \Delta_k. \quad \text{(Eq. 11)}$$

This modified error signal is no longer masked by the residual ISI because an estimate of the latter has been subtracted away leaving the desired error term $\Delta_k$. Taking the sign of $\tilde{e}_k$ now retains sufficient correlation with $\Delta_k$ that the "sign/sign" adaptation algorithm can operate properly.

Figure 8:
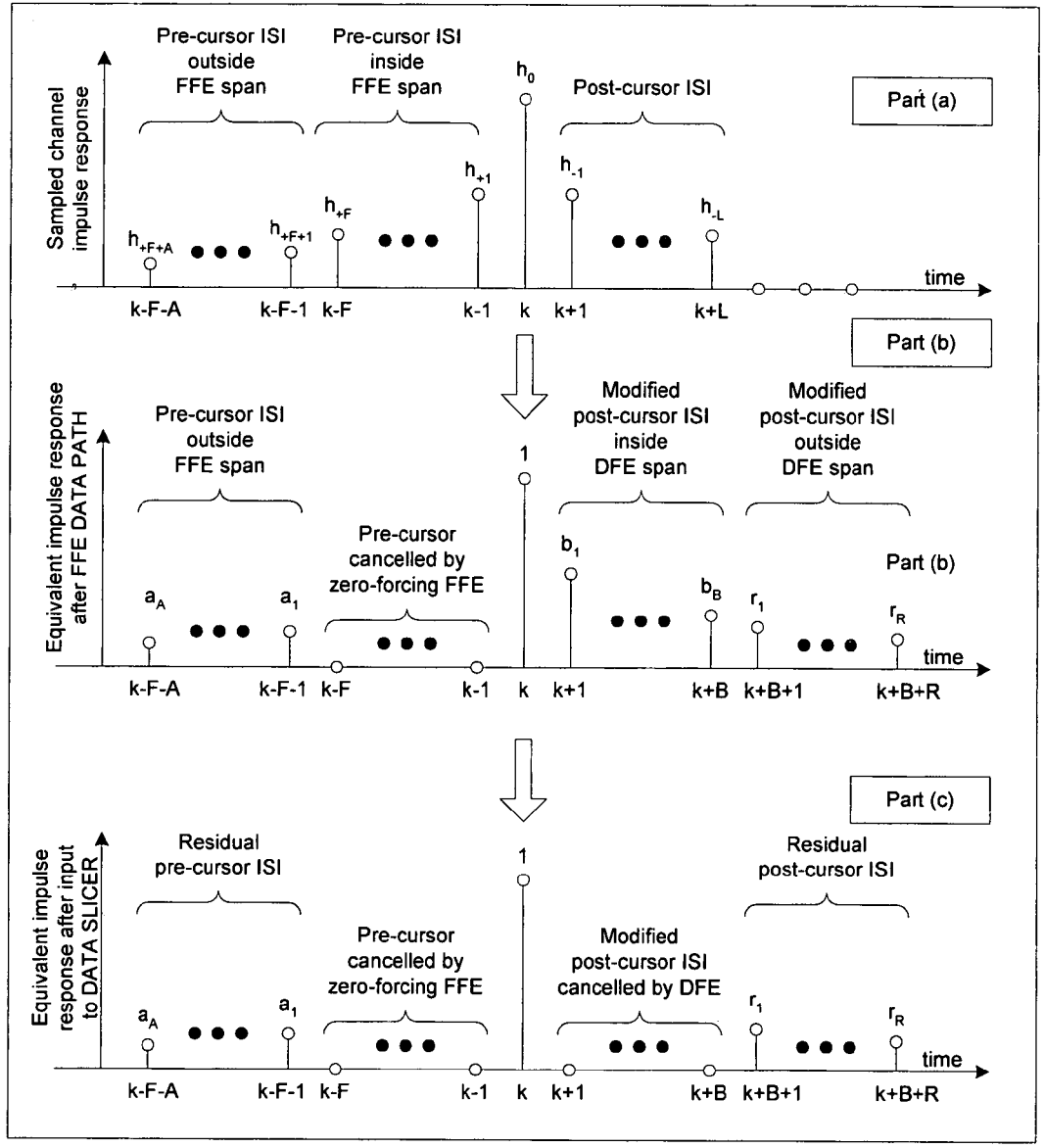
FIG. 8 shows a block diagram of a bank of RESIDUAL ISI CORRELATORS block of the ZF-DFE of FIG. 9.

Expanding the scope of the discussion to the general system of FIG. 8, assuming that estimators of the pre-cursor and post-cursor ISI terms in (Eq. 7) and (Eq. 10) may be made reliably with negligible estimation error. These estimates could then be subtracted from (Eq. 10) to yield a modified error signal $\tilde{e}_k$ given by:

$$\tilde{e}_k = e_k - \sum_{m=1}^{A} \hat{d}_{k+F+m} \cdot \hat{a}_m - \sum_{n=1}^{R} \hat{d}_{k-B-n} \cdot \hat{r}_n \approx \Delta_k. \quad \text{(Eq. 12)}$$

As in the simplified case, this modified error signal $\tilde{e}_k$ is no longer masked with the residual ISI terms, and retains sufficient correlation with $\Delta_k$ that the "sign/sign" adaptation algorithm can operate properly.

The same kind of zero-forcing tap correlators used to generate the FFE and DFE taps lying within the span of the ZF-DFE can also generate estimates $\{\hat{a}_m\}$ and $\{\hat{r}_n\}$ of residual ISI coefficients $\{a_m\}$ and $\{r_n\}$ lying outside the span of the equalizer. This applies to both pre-cursor and post-cursor types of ISI illustrated in FIG. 8(c). The approach is not restricted to zero-forcing correlators, but may be extended easily to other schemes such as minimum mean squared error (MMSE) correlators. Any suitable means of estimating the residual ISI coefficients is sufficient for the purposes of the invention. The RESIDUAL ISI CORRELATORS 106 in FIG. 9 perform this function for the embodiment of the invention described herein.

Once the residual ISI coefficients $\{a_m\}$ and $\{r_n\}$ are estimated, the residual ISI terms of the form of the two summation terms in (Eq. 12) may be computed and subtracted away from the desired error signal. The ADAPTIVE ERROR SLICER 107 in FIG. 9 performs this function in the embodiment described herein. Note that this operation involves covering the $\{a_m\}$ and $\{r_n\}$ estimates from the RESIDUAL ISI CORRELATORS 106 with the appropriate data symbols $\{d_k\}$ from the DATA SLICER 102 in order to compute the full residual ISI terms as shown in (Eq. 12).

Residual ISI Estimator

Figure 10:
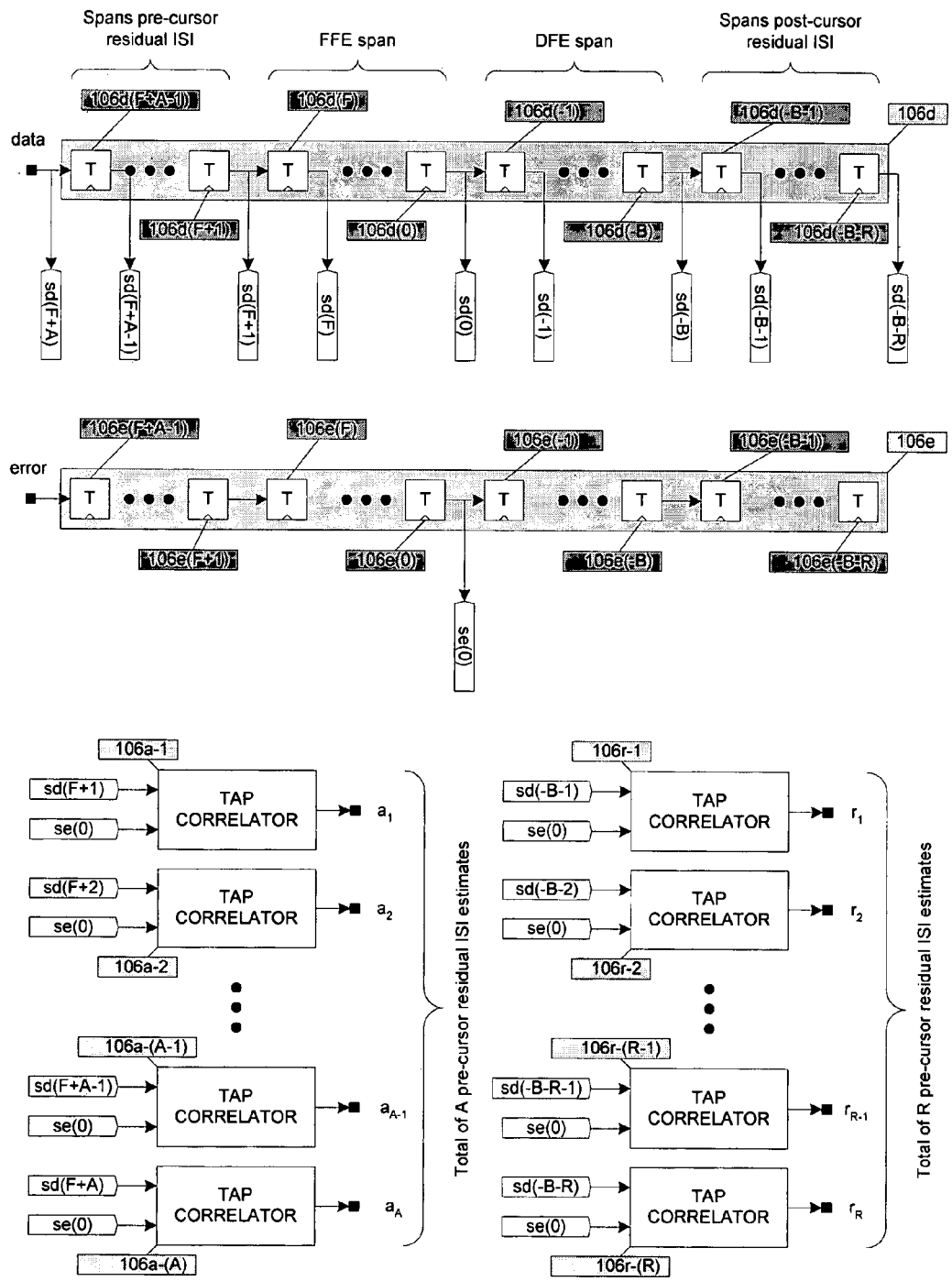
FIG. 10 provides a detailed block diagram of the RESIDUAL ISI CORRELATORS.

FIG. 10 provides a detailed block diagram of the RESIDUAL ISI CORRELATORS 106. This block implements two banks of zero-forcing correlators to form estimates of the residual ISI coefficients $\{a_m\}$ and $\{r_n\}$.

The block contains A identical TAP CORRELATOR blocks 106a-1 through 106a-(A). that produce estimates of residual pre-cursor ISI samples $a_1$ through $a_A$ shown in FIG. 8(c). Each TAP CORRELATOR contains a "data" and an "error" input. A shift register 106d provides delayed versions of the DATA SLICER 102 output $\hat{d}_k$ for the "data" inputs of the TAP CORRELATOR blocks. A shift register 106e provides a single delayed version of the ADAPTIVE ERROR SLICER 107 output $e_k$ that is used for the "error" input of all TAP CORRELATOR blocks. The timing relationships between these "data" and "error" inputs are crucial to achieving proper operation of the TAP CORRELATOR blocks, and are selected to match those between the various residual ISI samples shown in (Eq. 10).

TAP CORRELATOR 106a-1 can produce an estimate $\hat{a}_1$ of $a_1$ by correlating an estimate $\hat{d}_{k+F+1}$ of $d_{k+F+1}$ with the error signal $e_k$. This works because these two signals, $\hat{d}_{k+F+1}$ and $e_k$, remain mutually correlated until the ISI estimate $\hat{a}_1$ becomes a close approximation to the actual ISI term $a_1$. The data input $\hat{d}_{k+F+1}$ represents the correct signal to correlate with error signal $e_k$ to obtain $\hat{a}_1$ because the term $d_{k+F+1}a_1$ appears as a component of $e_k$ in (Eq. 10).

The estimate $\hat{d}_{k+F+1}$ of $d_{k+F+1}$ for the "data" input of TAP CORRELATOR 106a-1 is produced by a shift register 106d that delays successive samples $\hat{d}_k$ obtained from the output of the DATA SLICER 102. Specifically, the cell 106d(F+1) produces output signal sd(F+1) that represents $\hat{d}_{k+F+1}$ and drives the "data" input of TAP CORRELATOR 106a-1.

The "error" input of TAP CORRELATOR 106a-1 is produced by a second shift register 106e that delays successive samples $e_k$ obtained from the output of the ADAPTIVE ERROR SLICER 107. Specifically, the cell 106e(0) produces output signal se(0) that represents $e_k$ and drives the "error" input of TAP CORRELATOR 106a-1.

The remaining TAP CORRELATOR blocks 106a-2 through 106a-(A) operate in a fashion similar to that described above for 106a-1. TAP CORRELATOR 106a-2 produces an estimate $\hat{a}_2$ of $a_2$ by correlating $\hat{d}_{k+F+2}$ with $e_k$, where the former is obtained as signal sd(F+2) from cell 106d(F+2) of shift register 106d and the latter is obtained as signal se(0) from cell 106e(0) of shift register 106e. Finally, TAP CORRELATOR 106a-(A) produces an estimate $\hat{a}_A$ of $a_A$ by correlating $\hat{d}_{k+F+A}$ with $e_k$, where the former is obtained as signal sd(F+A) and the latter is obtained as signal se(0) from cell 106e(0) of shift register 106e.

The RESIDUAL ISI CORRELATORS 106 also contains R identical TAP CORRELATOR blocks 106r-1 through 106r-(R) that produce estimates of residual post-cursor ISI samples $r_1$ through $r_R$ shown in FIG. 8(c). These TAP CORRELATOR blocks operate in similar fashion to those that estimate the pre-cursor ISI described above, and obtain also their "data" inputs from shift register 106d and error input from shift register 106e.

TAP CORRELATOR 106r-1 can produce an estimate $\hat{r}_1$ of $r_1$ by correlating an estimate $\hat{d}_{k-B-1}$ of $d_{k-B-1}$ with the error signal $e_k$. This works because these two signals, $\hat{d}_{k-B-1}$ and $e_k$, remain mutually correlated until the ISI estimate $\hat{r}_1$ becomes a close approximation to the actual ISI term $r_1$. The data input $\hat{d}_{k-B-1}$ represents the correct signal to correlate with error signal $e_k$ to obtain $\hat{r}_1$ because the term $d_{k-B-1}r_1$ appears as a component of $e_k$ in (Eq. 10).

The estimate $\hat{d}_{k-B-1}$ of $d_{k-B-1}$ for the "data" input of TAP CORRELATOR 106r-1 is produced by a shift register 106d that delays successive samples $\hat{d}_k$ obtained from the output of the DATA SLICER 102. Specifically, the cell 106d(-B-1) produces output signal sd(-B-1) that represents $\hat{d}_{k-B-1}$ and drives the "data" input of TAP CORRELATOR 106r-1.

The "error" input of TAP CORRELATOR 106r-1 is produced by shift register 106e that delays successive samples $e_k$ obtained from the output of the ADAPTIVE ERROR SLICER 107. Specifically, the cell 106e(0) produces output signal se(0) that represents $e_k$ and drives the "error" input of TAP CORRELATOR 106r-1.

The remaining TAP CORRELATOR blocks 106r-2 through 106r-(R) operate in a fashion similar to that described above for 106r-1. TAP CORRELATOR 106r-2 produces an estimate $\hat{r}_2$ of $r_2$ by correlating $\hat{d}_{k-B-2}$ with $e_k$, where the former is obtained as signal sd(-B-2) from cell 106d(-B-2) of shift register 106d and the latter is obtained as signal se(0) from cell 106e(0) of shift register 106e. Finally, TAP CORRELATOR 106r-(R) produces an estimate $\hat{r}_R$ of $r_R$ by correlating $\hat{d}_{k-B-R}$ with $e_k$, where the former is obtained as signal sd(-B-R) and the latter is obtained as signal se(0) from cell 106e(0) of shift register 106e.

Adaptive Error Slicer

Figure 11:
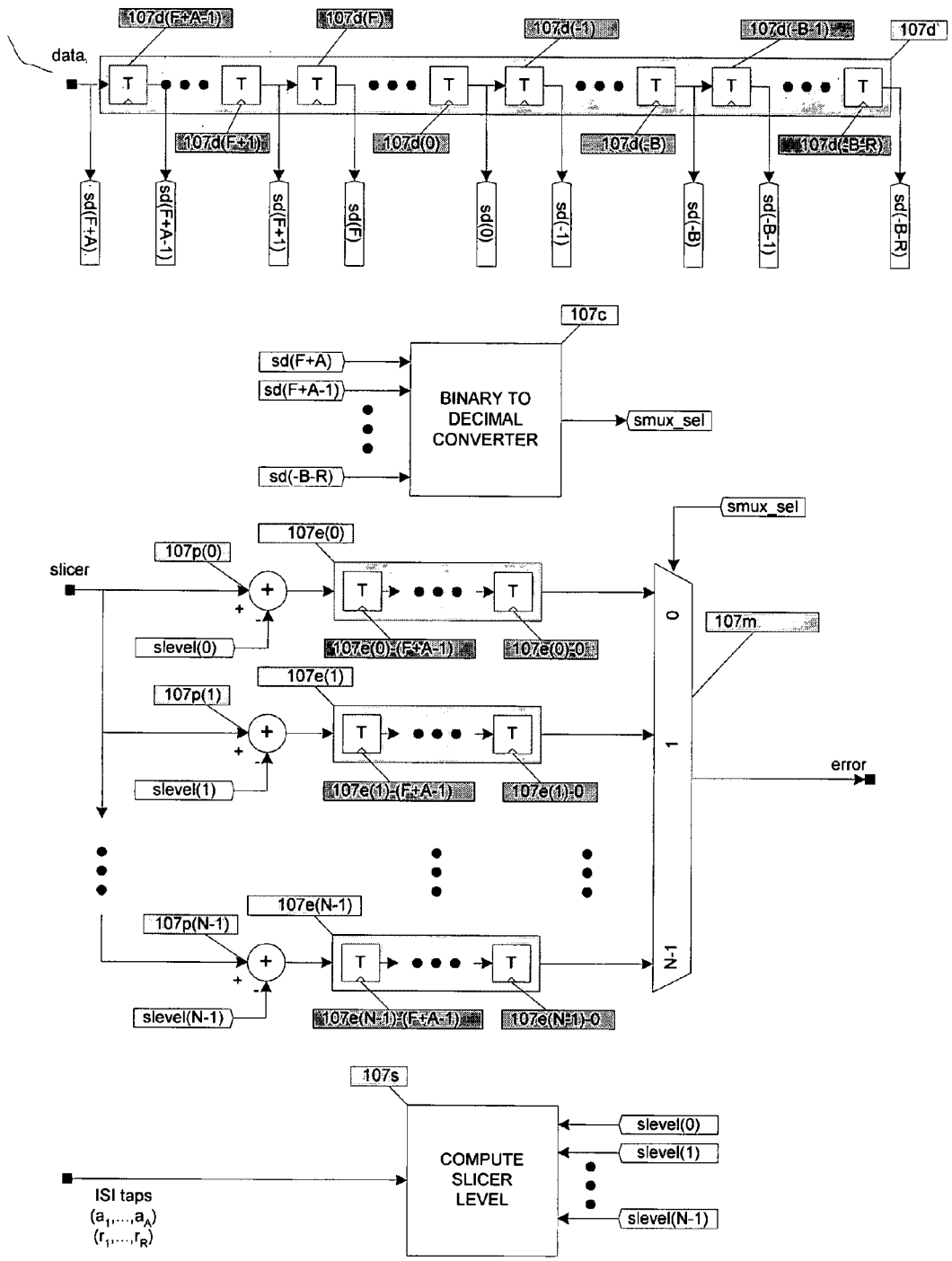
FIG. 11 shows a block diagram of the ADAPTIVE ERROR SLICER block of the ZF-DFE of FIG. 9.

FIG. 11 provides a detailed block diagram of the ADAPTIVE ERROR SLICER 107 that computes the residual ISI terms shown as summations in (Eq. 12) and subtractions them away from the DATA SLICER 102 output signal $\hat{d}_k$ to obtain an error signal $\tilde{e}_k$ that approximates the desired error tap weight estimation error $\Delta_k$ that may be used in the "sign/sign" adaptation algorithm.

Estimates $\{\hat{a}_m\}$ and $\{\hat{r}_n\}$ of the residual pre-cursor and post-cursor ISI coefficients produced by the RESIDUAL ISI CORRELATORS 106 may be combined with the detected data sequence $\{\hat{d}_k\}$ produced by the DATA SLICER 102 as follows. For a specific data sequence $(\hat{d}_{k+F+A}, \ldots, \hat{d}_{k-B-R})$, an estimate of the total ISI is given by:

$$i_k = \sum_{m=1}^{A} \hat{d}_{k+F+m} \cdot \hat{a}_m + \sum_{n=1}^{R} \hat{d}_{k-B-n} \cdot \hat{r}_n. \quad \text{(Eq. 13)}$$

Since the data sequence $(\hat{d}_{k+F+A}, \ldots, \hat{d}_{k-B-R})$ contains $M=(1+F+A+B+R)$ binary symbols, the transmitter could have sent any particular sequence from a set of $N=2^M$ possible sequences of this length. Since the particular sequence is not known until the DATA SLICER 102 processes the entire sequence, all possible combinations of the data sequence $\{\hat{d}_{k+F+A}, \ldots, \hat{d}_{k-B-R}\}$ must be used to compute N different versions of (Eq. 13). Each of these candidate ISI estimates may then be subtracted away from the DATA SLICER 102 output to form N different error signals $\tilde{e}_k$, of which only one is correct. These N error signals may then be buffered while the actual received data sequence $(\hat{d}_{k+F+A}, \ldots, \hat{d}_{k-B-R})$ is also received and buffered. Once the entire data sequence is buffered, the error signal $\tilde{e}_k$ with data pattern in (Eq. 13) matching the received sequence $(\hat{d}_{k+F+A}, \ldots, \hat{d}_{k-B-R})$ is selected as the correct error signal.

The COMPUTE SLICER LEVEL 107s in FIG. 11 performs the function of computing (Eq. 13) for all possible combinations of the data sequence pattern $\{\hat{d}_{k+F+A}, \ldots, \hat{d}_{k-B-R}\}$ given the set of estimated ISI coefficients $\{\hat{a}_m\}$ and $\{\hat{r}_n\}$. The block generates a total of N output signals slevel(0) through slevel(N-1) that represent the value of $i_k$ in (Eq. 13) for each of the possible combinations of data sequence.

A parallel bank of subtractors 107p(0) through 107p(N-1) removes the N estimates of residual ISI $i_k$ from the DATA SLICER 102 output. Subtractor 107p(0) removes ISI estimate slevel(0) and applies its output to an error shift register 107e(0). Subtractor 107p(1) removes ISI estimate slevel(1) and applies its output to an error shift register 107e(1). This continues for all subtractors until finally subtractor 107p(N-1) removes ISI estimate slevel(N-1) and applies its output to an error shift register 107e(N-1).

The error shift registers 107e(0) through 107e(N-1) perform the buffering of the N error signal $\tilde{e}_k$ described above. All error shift registers are identical and contain the same number of cells numbered (for example from shift register 107e(0)) from 107e(0)-0 through 107e(0)-(F+A-1).

The data shift register 107d buffers the incoming sequence of data sequence $\{\hat{d}_k\}$ generated at the output of the DATA SLICER 102 as described above. The shift register contains M-1 cells 107d(F+A-1) through 107d(-B-R) to buffer completely the data sequence $(\hat{d}_{k+F+A}, \ldots, \hat{d}_{K-B-R})$. All M-1 binary cell outputs are routed as signals sd(F+A-1) through sd(-B-R) along with the current data input signal sd(F+A) to the input of the BINARY TO DECIMAL CONVERTER 107c. This block converts the binary vector $(\hat{d}_{k+F+A}, \ldots, \hat{d}_{k-B-R})$ into an equivalent decimal-valued signal smux_sel used as a selector control for the error multiplexer 107m.

The error multiplexer 107m selects the correct ISI estimate from the N candidates based on the selector control signal smux_sel that conveys the particular data sequence $(\hat{d}_{k+F+A}, \ldots, \hat{d}_{k-B-R})$ that was produced at the output of the DATA SLICER 102.

SECOND EMBODIMENT OF THE INVENTION

The ADAPTIVE ERROR SLICER 107 employs a parallel architecture to compute all candidate error signals $\tilde{e}_k$ corresponding to all possible data sequences $\{\hat{d}_{k+F+A}, \ldots, \hat{d}_{k-B-R}\}$ that may have been transmitted. This architecture permits operation of the closed-loop "sign/sign" algorithm at the full line rate (or transmission rate of the data symbols $\{d_k\}$) by processing all possible candidates simultaneously (in parallel), and then selecting the correct error signal that matches the detected data sequence $(\hat{d}_{k+F+A}, \ldots, \hat{d}_{k-B-R})$. As a result, the adaptation rate of the "sign/sign" algorithm matches the transmission rate over the channel.

The propagation characteristics of the transmission medium often change dynamically at rates much slower than the line rate in many applications. Consequently, in such situations there is no practical reason for the adaptive tracking algorithms (such as "sign/sign" adaptation) to operate at the line rate. Often, adaptation rates that are orders of magnitude lower than the line rate are sufficient in practice. For example, the line rate of many high-speed fiber-optic LANs approaches 10 Gbps, whereas the dynamics of the underlying optical fiber channel change at a rate of only tens of Hz.

In situations where an adaptation rate significantly lower than the line rate provides adequate tracking performance, a serial architecture for adaptive error slicer achieves the same function as the original parallel architecture but with much less implementation complexity. In effect, the serial architecture trades off a reduced adaptation rate for reduced hardware complexity, as compared to the parallel architecture.

This section describes this simplified embodiment of the invention based on a serial architecture for the adaptive error slicer.

ZF-DFE with Serial Adaptive Error Slicer & Subsampling Correlators

Figure 12:
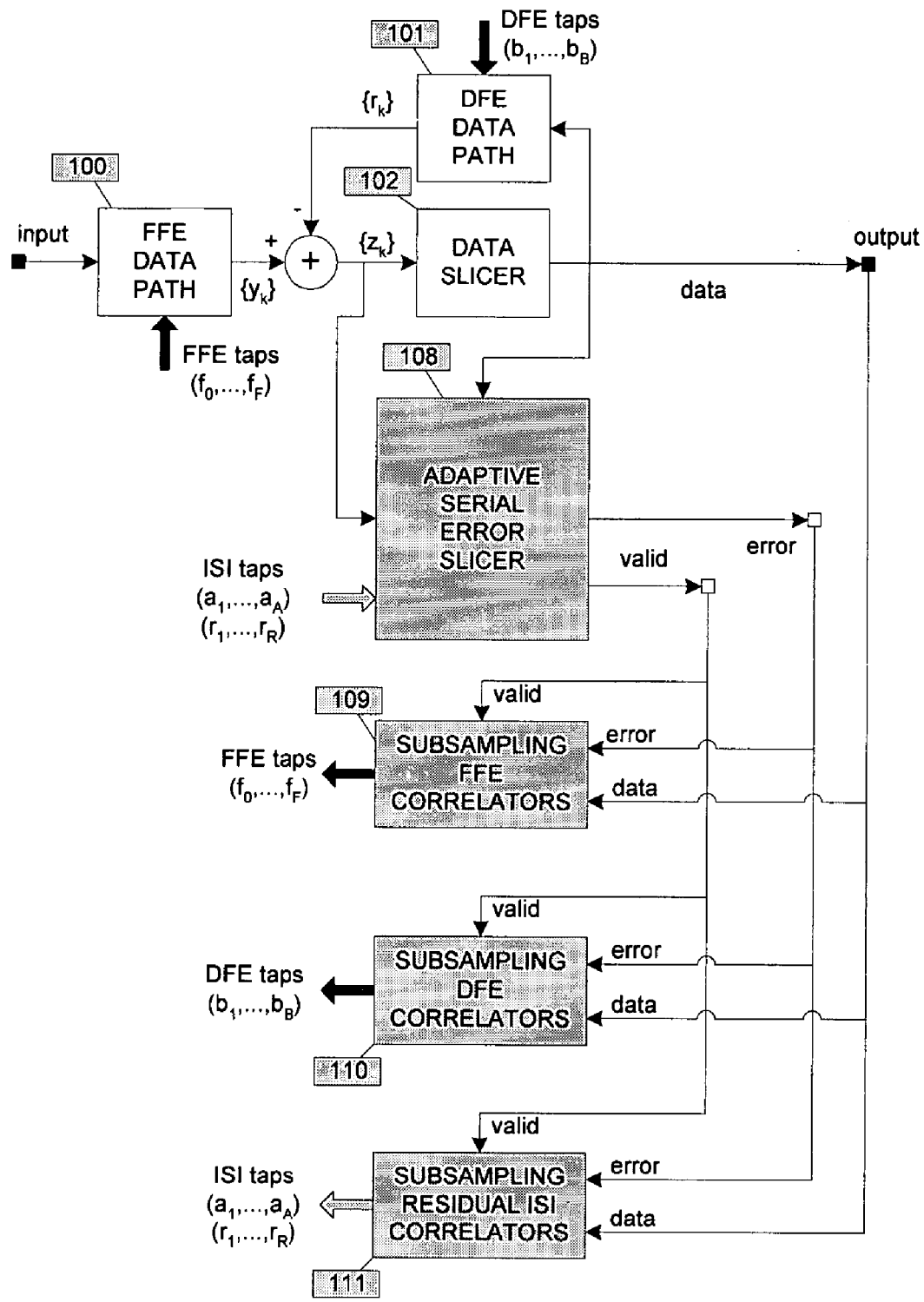
FIG. 12 shows a block diagram of a ZF-DFE according to another embodiment of the invention.

FIG. 12 shows a block diagram of the simplified embodiment of the invention based on a serial architecture for the error slicer. As compared to the parallel architecture shown in FIG. 9, the serial architecture replaces the (parallel) ADAPTIVE ERROR SLICER 107 with an ADAPTIVE SERIAL ERROR SLICER 108, and replaces the FFE CORRELATORS 104, DFE CORRELATORS 105 and RESIDUAL ISI CORRELATORS 106 with SUBSAMPLING FFE CORRELATORS 109, SUBSAMPLING DFE CORRELATORS 110, and SUBSAMPLING RESIDUAL ISI CORRELATORS 111, respectively. The operation of the FFE DATA PATH 100, DFE DATA PATH 101, and DATA SLICER 102 remain unchanged.

The expression for the residual ISI estimates in (Eq. 13) motivates the concept for the serial implementation of the adaptive error slicer. Rather than producing an ISI estimate $i_k$ for all N possible data sequences $\{d_{k+F+A}, \ldots, d_{k-B-R}\}$ in parallel and then selecting the correct one based on the received data sequence $(d_{k+F+A}, \ldots, d_{k-B-R})$, one may produce only a single ISI estimate using a particular data sequence denoted as $(\hat{\delta}_{k+F+A}, \ldots, \hat{\delta}_{k-B-R})$. With this particular data sequence, the ISI estimate in (Eq. 13) becomes the following:

$$i_k = \sum_{m=1}^{A} \hat{\delta}_{k+F+m} \cdot \hat{a}_m + \sum_{n=1}^{R} \hat{\delta}_{k-B-n} \cdot \hat{r}_n \quad \text{(Eq. 14)}$$

When this particular data sequence, referred to as the "data setting" matches the received data sequence, the output of the ISI estimate in (Eq. 13) will match the actual residual ISI and the error signal $\tilde{e}_k \approx \Delta_k$ as required for successful application of the "sign/sign" algorithm. However, when the data setting ($\hat{\delta}_{k+F+A}, \ldots, \hat{\delta}_{k-B-R}$) does not match the received data sequence $(d_{k+F+A}, \ldots, d_{k-B-R})$, the error signal $\tilde{e}_k$ will contain residual ISI due to the mismatch in data symbols, and if applied by the "sign/sign" algorithm will lead to "dead-zone" convergence and tracking problems.

The discussion above highlights a successful strategy for adopting a low-complexity serial architecture for the adaptive error slicer. When the data setting $(\hat{\delta}_{k+F+A}, \ldots, \hat{\delta}_{k-B-R})$ matches the received data sequence $(d_{k+F+A}, \ldots, d_{k-B-R})$ in the buffer, the error signal $\tilde{e}_k$ is considered "valid", and the various tap weight correlators for the FFE, DFE, and residual ISI coefficients are updated using $\tilde{e}_k$ and the appropriate data input. When the data setting and received data sequence disagree, the error signal is not "valid", and all tap weight correlators are held in a "frozen" state. The "valid" signal then becomes a gating control input to the tap weight correlators; "sign/sign" updates are performed only when "valid" is asserted, otherwise the tap weights values are held constant.

Subsampling Correlators

Use of the serial adaptive error slicer requires all correlator blocks to include a new "valid" input to hold the correlators frozen when the data setting does not match the received data sequence. In effect, the inputs to the correlator become sub-sampled at a rate lower than the line rate. For this reason, the modifications are referred to as "subsampling correlators".

The ratio of the original line rate to the adaptation rate of the sub-sampled correlators is referred to as the "subsampling factor". This factor is related to the number of candidate data sequences N. On average, the data setting $(\hat{\delta}_{k+F+A}, \ldots, \hat{\delta}_{k-B-R})$ will match the actual received data sequence $(d_{k+F+A}, \ldots, d_{k-B-R})$ one time out of N assuming the transmitted data symbols occur with equal probability. It follows that the adaptation rate of the "sign/sign" algorithm using an adaptive serial error slicer and subsampling correlators is N times smaller than the line rate of the application.

Figure 5:
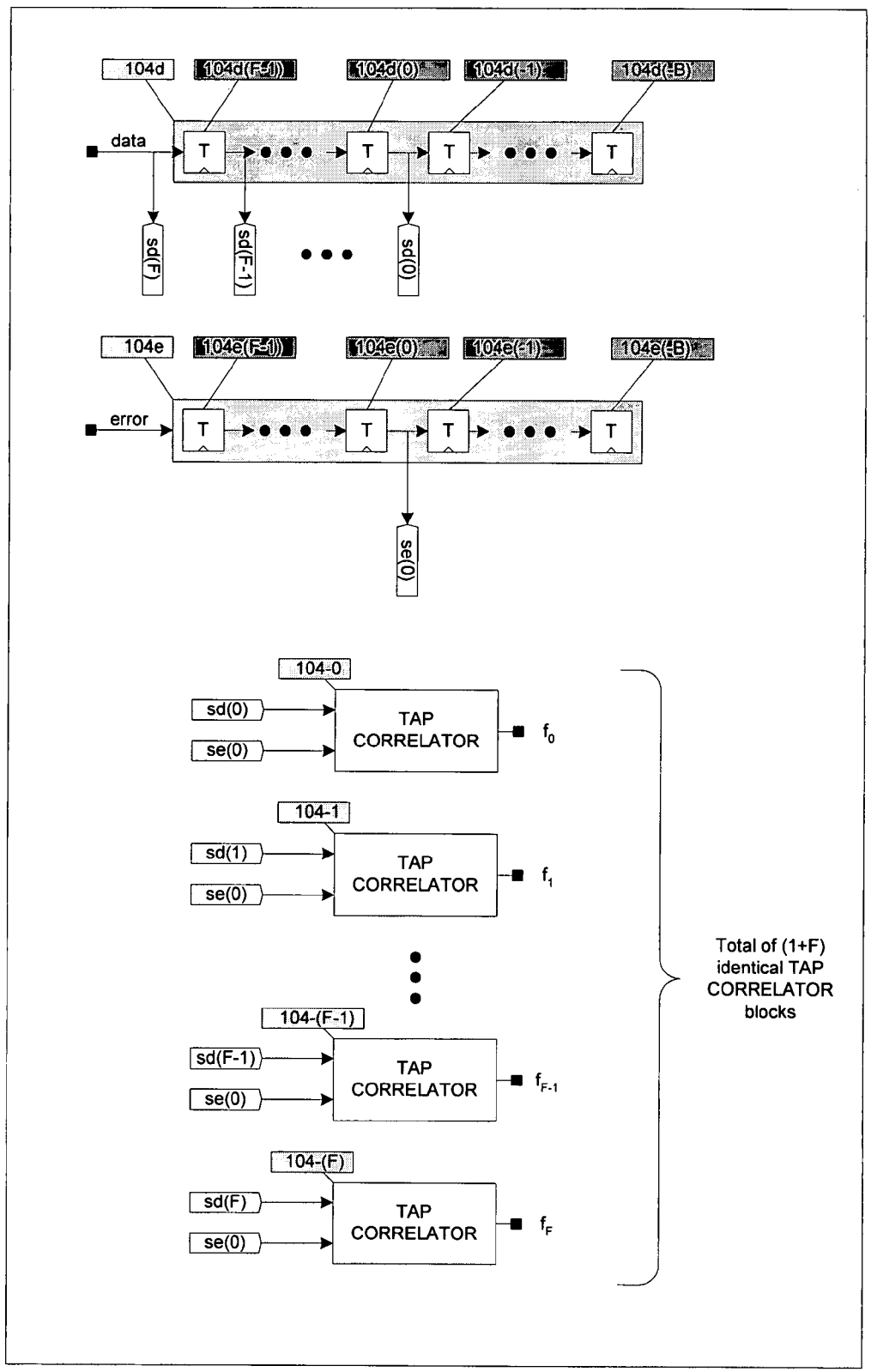
FIG. 5 shows a block diagram of the FFE CORRELATORS block of the ZF-DFE of FIG. 2.
Figure 13:
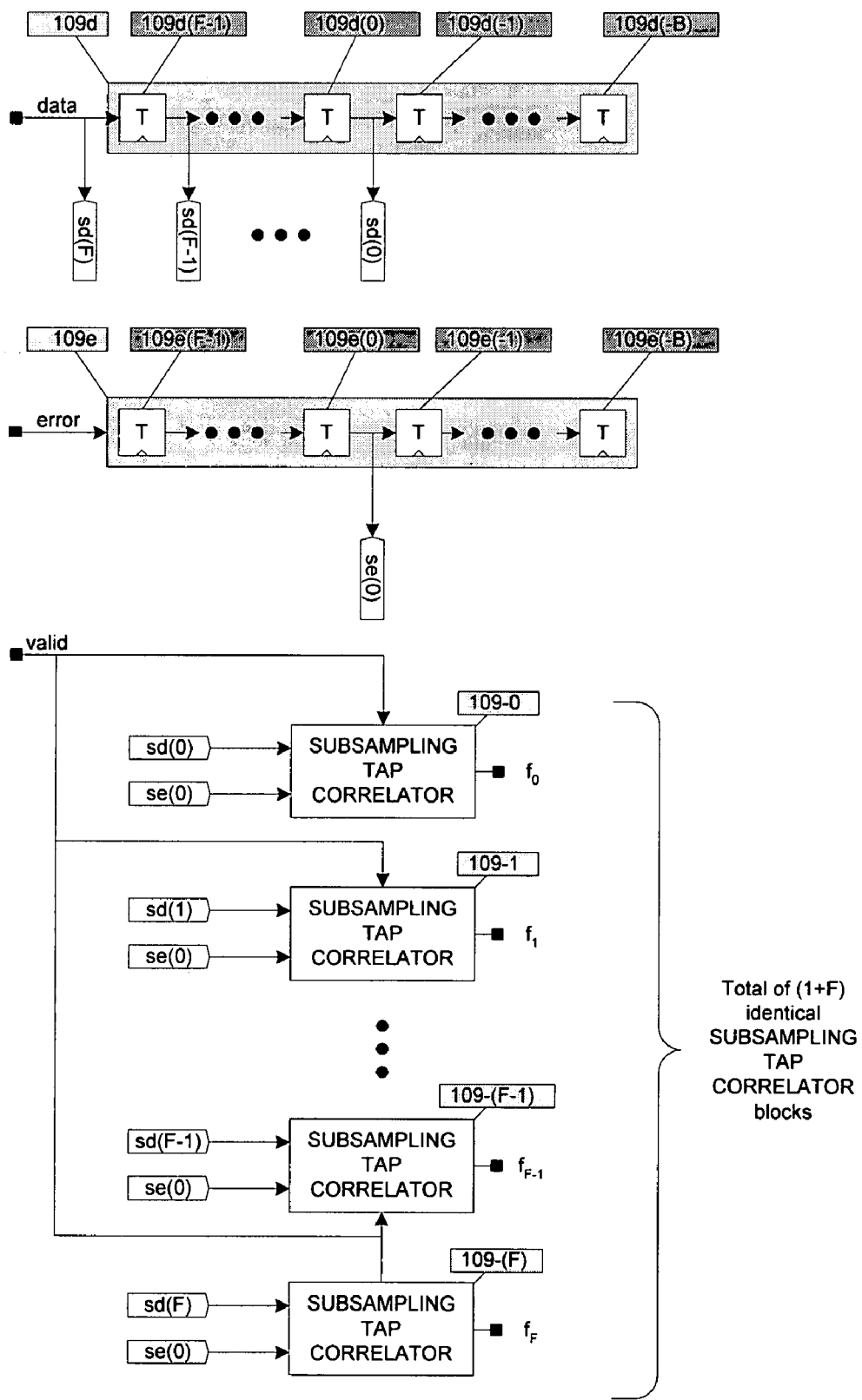
FIG. 13 shows a block diagram of the SUBSAMPLING FFE CORRELATORS block of the ZF-DFE of FIG. 12.

FIG. 13 shows a block diagram of the SUBSAMPLING FFE CORRELATORS 109. The block is identical to the FFE CORRELATORS 104 in FIG. 5 except that the TAP CORRELATOR blocks 104-0 through 104-(F) have been replaced with SUBSAMPLING TAP CORRELATOR blocks 109-0 through 109-(F), and the "valid" input signal is applied to each block.

Figure 6:
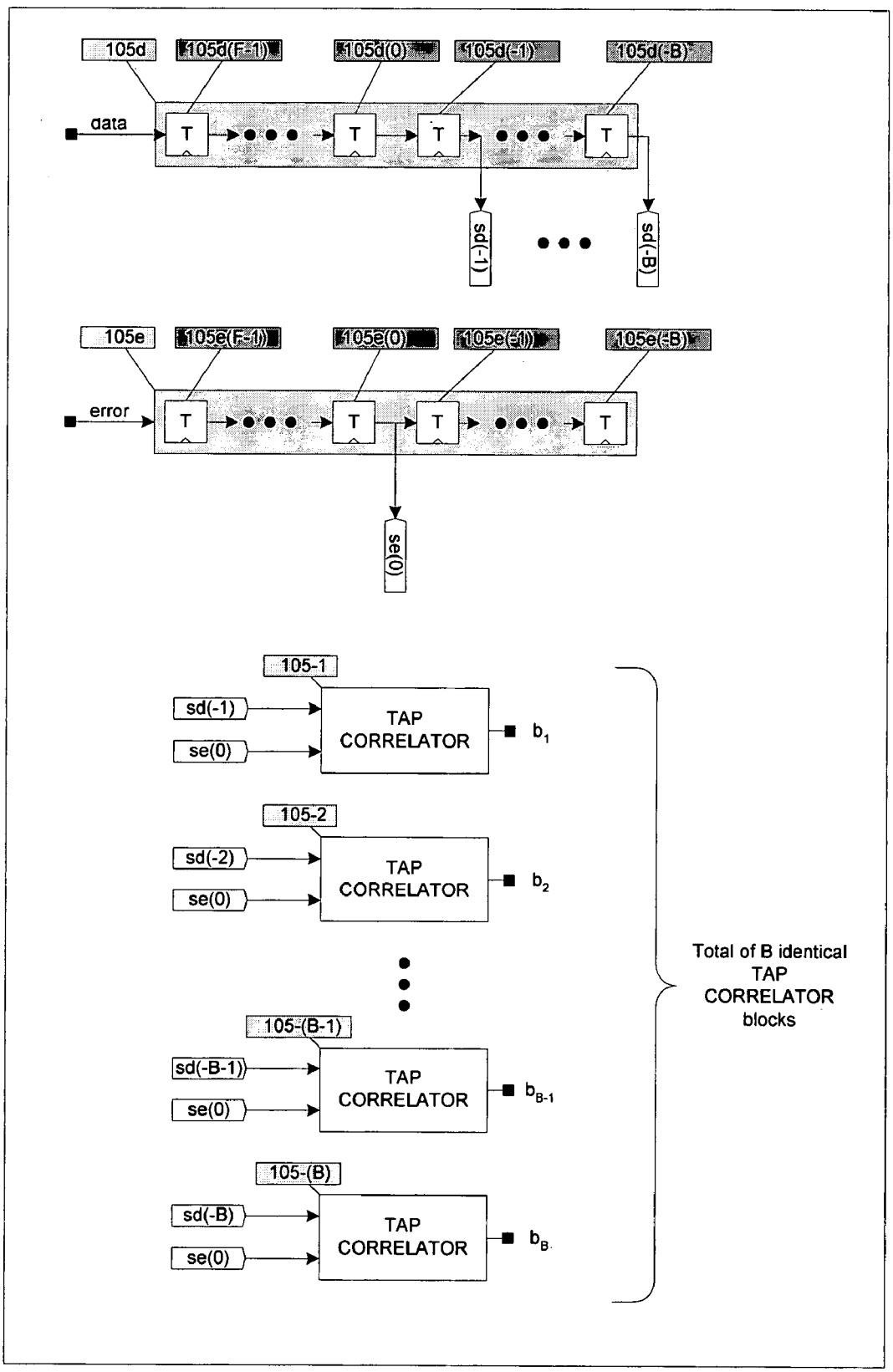
FIG. 6 illustrates operation of a conventional ZF-DFE with residual ISI.
Figure 14:
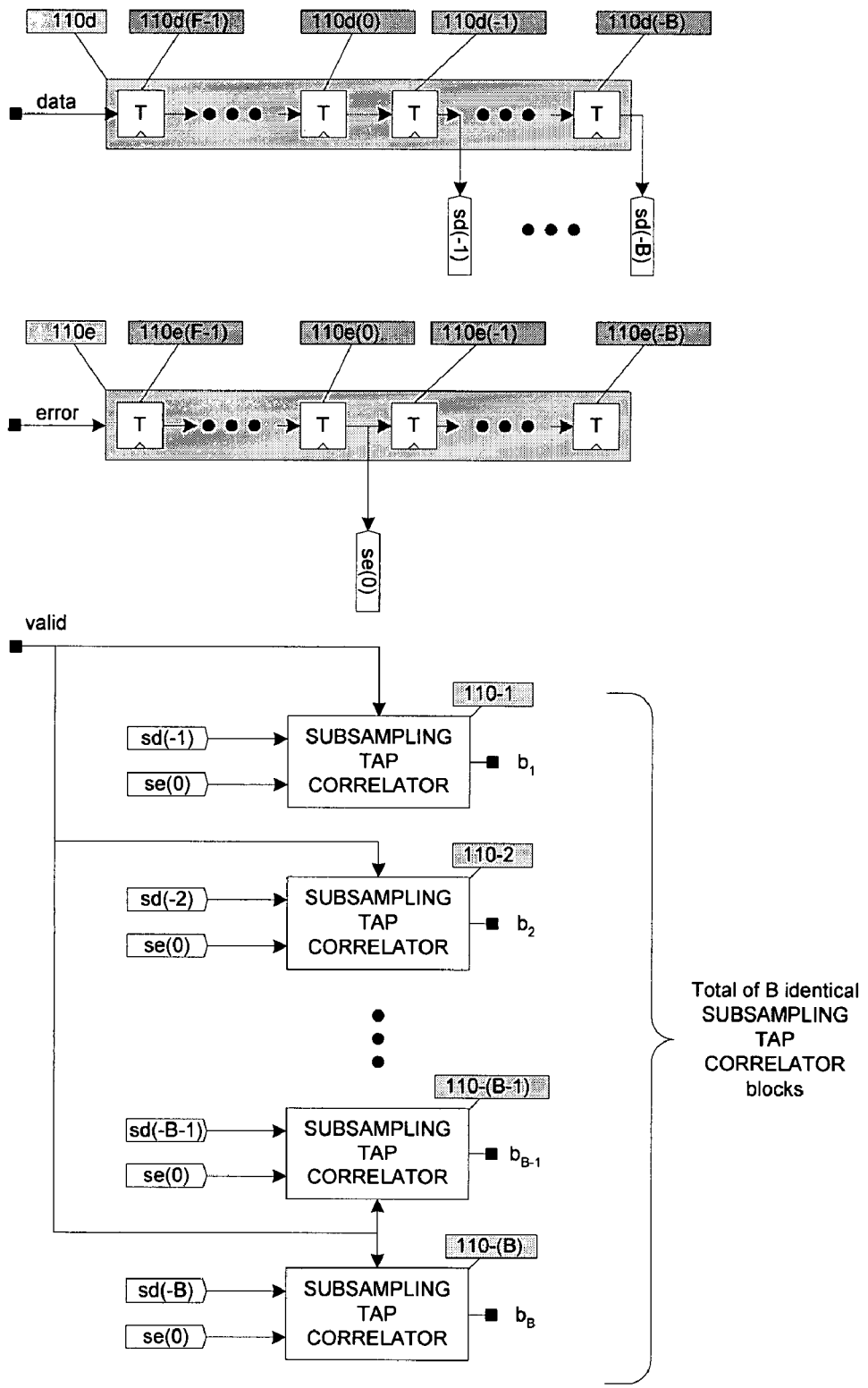
FIG. 14 shows a block diagram of the SUBSAMPLING DFE CORRELATORS block of the ZF-DFE of FIG. 12.

FIG. 14 shows a block diagram of the SUBSAMPLING DFE CORRELATORS 110. The block is identical to the DFE CORRELATORS 105 in FIG. 6 except that the TAP CORRELATOR blocks 105-1 through 105-(B) have been replaced with SUBSAMPLING TAP CORRELATOR blocks 110-1 through 110-(B), and the "valid" input is signal is applied to each block.

Figure 15:
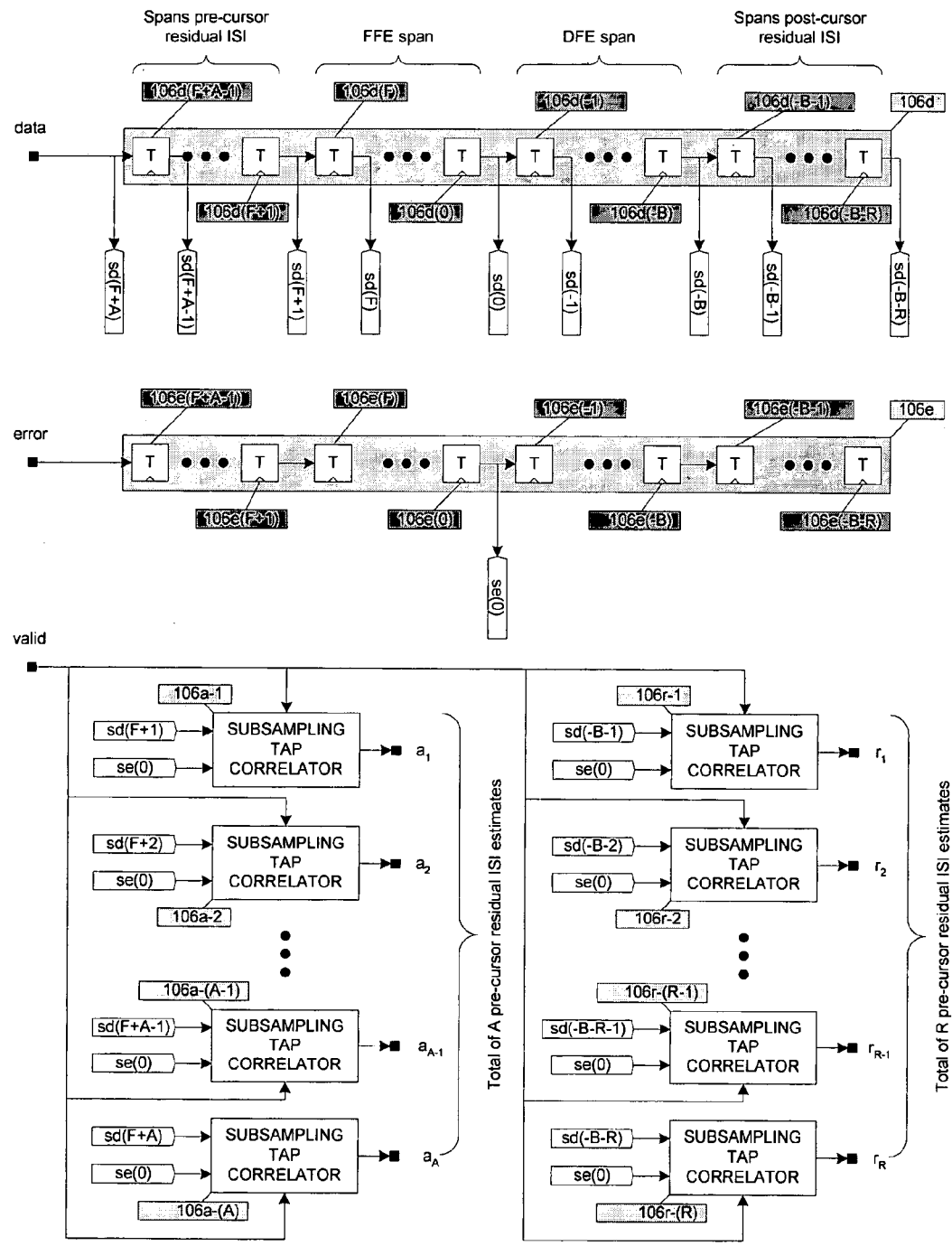
FIG. 15 shows a block diagram of the SUBSAMPLING RESIDUAL ISI CORRELATORS block of the ZF-DFE of FIG. 12.

FIG. 15 shows a block diagram of the SUBSAMPLING RESIDUAL ISI CORRELATORS 111. The block is identical to the RESIDUAL ISI CORRELATORS 106 in FIG. 10 except that the TAP CORRELATOR blocks 106a-1 through 106a-(A) and blocks 106r-1 through 106r-(R) have been replaced with SUBSAMPLING TAP CORRELATOR blocks 111a-1 through 111a-(A) and blocks 111r-1 through 111r-(R), respectively, and the "valid" input signal is applied to each block.

Figure 7:
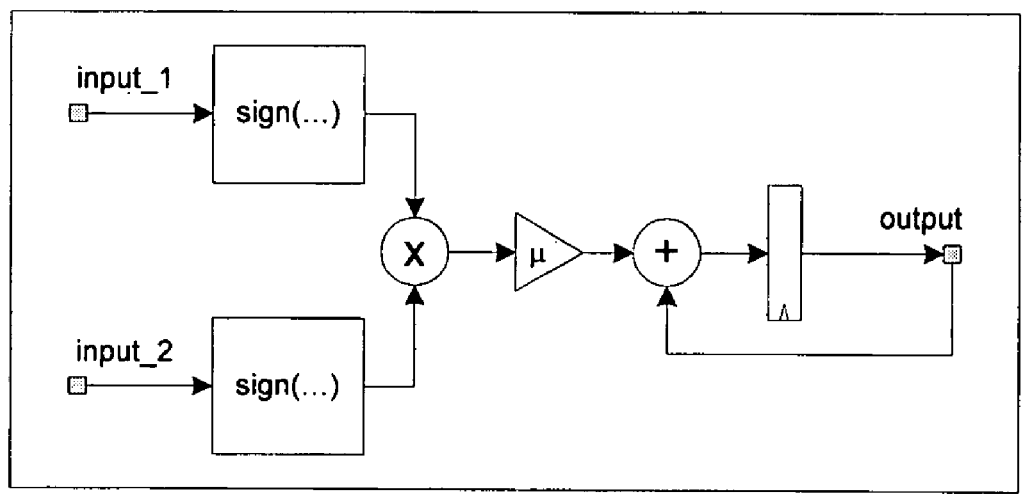
FIG. 7 shows a block diagram of a ZF-DFE according to one embodiment of the invention.
Figure 16:
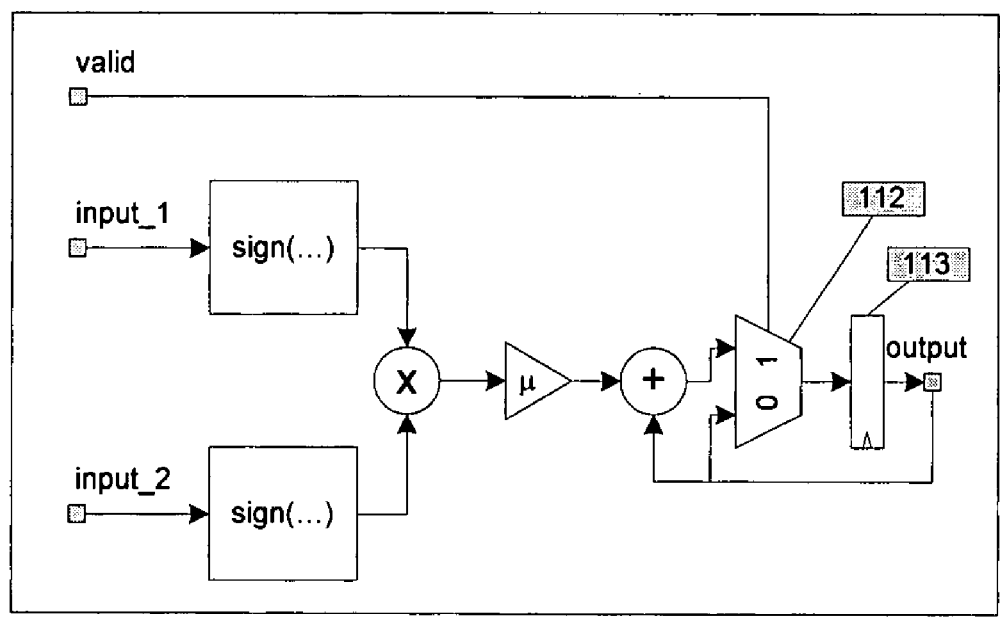
FIG. 16 shows a block diagram of the SUBSAMPLING TAP CORRELATOR block used in the SUBSAMPLING FFE CORRELATORS block of FIG. 13, SUBSAMPLING DFE CORRELATORS block of FIG. 14, and SUBSAMPLING RESIDUAL ISI CORRELATORS block of FIG. 15.

FIG. 16 shows a block diagram of the SUBSAMPLING TAP CORRELATOR block. The block is identical to the TAP CORRELATOR block in FIG. 7 except for the addition of the "valid" input signal and the addition of the output multiplexer 112. When the "valid" signal is active (1), the output multiplexer 112 passes the updated tap weight to the output register 113. When the "valid" signal is inactive (0), the output multiplexer 112 re-circulates the previous output to the input of the output register 113. Consequently, the tap correlator outputs are only updated when the input error signal is valid, as indicated by the "valid" input signal.

Serial Adaptive Error Slicer

Figure 17:
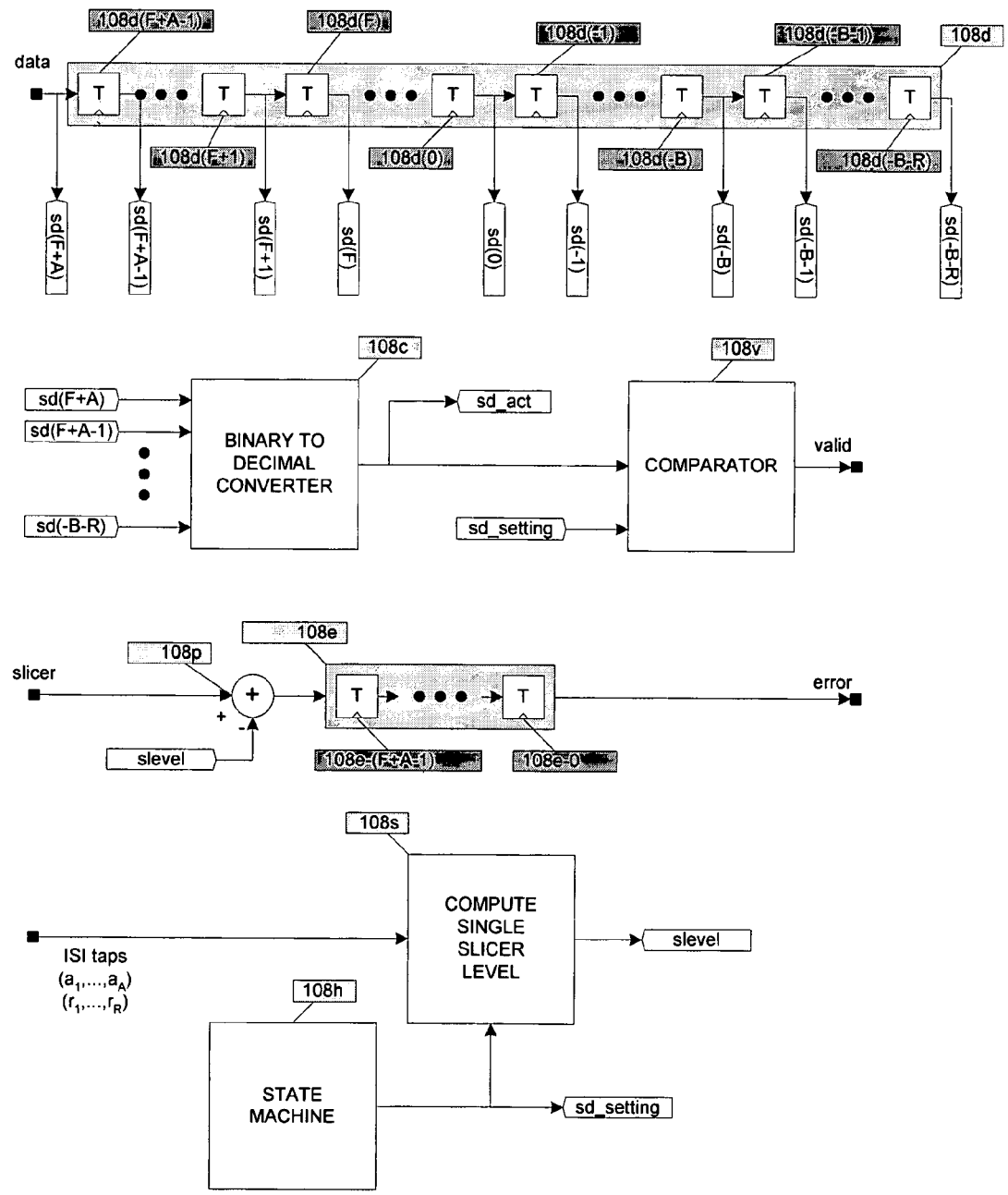
FIG. 17 shows a block diagram of the ADAPTIVE SERIAL ERROR SLICER block of the ZF-DFE of FIG. 12.

FIG. 17 shows a block diagram of the ADAPTIVE SERIAL ERROR SLICER 108.

The COMPUTE SINGLE SLICER LEVEL 108s computes and ISI term $i_k$ according to (Eq. 14) using the residual ISI estimates $\{\hat{a}_m\}$ and $\{\hat{r}_n\}$ from the correlators, and based on the current data setting $(\hat{\delta}_{k+F+A}, \ldots, \hat{\delta}_{k-B-R})$ represented by signal sd_setting and produced by the STATE MACHINE 108h to produce the error slicing level carried by output signal slevel.

Subtractor 108p subtracts the error slicing level carried by signal slevel from the "slicer" input obtained from the output of the DATA SLICER 102 to produce the current error signal $\tilde{e}_k$. This signal in turn is input to an error shift register 108e with cells 108e-0 through 108e-(F+A−1). The error shift register 108e aligns the sequence of error signals $\tilde{e}_k$ with the data decisions in the data shift register 108d to maintain the proper phase relationships as described by (Eq. 12).

The data shift register 108d and BINARY TO DECIMAL CONVERTER 108c of FIG. 17 perform functions identical to those performed by data shift register 107d and BINARY TO DECIMAL CONVERTER 107c of FIG. 11.

The output signal sd_act of the BINARY TO DECIMAL CONVERTER 108c forms an input to the COMPARATOR 108v along with the current data setting sd_setting. The COMPARATOR 108v inspects its two inputs to determine if the received data sequence ($\hat{d}_{k+F+A}, \ldots, \hat{d}_{k-B-R}$) matches the current data setting ($\hat{\delta}_{k+F+A}, \ldots, \hat{\delta}_{k-B-R}$). If a match occurs the "valid" output signal is asserted, otherwise the "valid" signal is not asserted.

The STATE MACHINE 108h sets the current data setting ($\hat{\delta}_{k+F+A}, \ldots, \hat{\delta}_{k-B-R}$) carried by signal sd_setting in the adaptive serial error slicer. A number of different approaches are possible for selecting the data setting. One strategy would be to select a fixed setting that remains constant over all time. A more useful approach is to vary the data setting slowly such that, over time, the setting migrates through the complete sequence of all possible data sequences $\{\hat{d}_{k+F+A}, \ldots, \hat{d}_{k-B-R}\}$. This strategy is advantageous when device mismatches in the circuitry used to implement the various components of the invention introduce asymmetric impairments such as DC offset, since those impairments becomes averaged out by the tap correlators. Moreover, such averaging also moderates degradations due to pattern dependencies in the data sequence.

Thus, an improved adaptive error slider and residual intersymbol interference estimator has been provided.

The scope of the present invention includes FFE and DFE-based architectures for both low rate and high rate applications. The focus in the sequel lies with DFE architectures since the drive for using low-complexity implementations (like the sign/sign algorithm) arises from high rate applications such as 10 Gbps fiber-optic LANs where conventional approaches become impractical.

The scope of the present invention also applies to both the discrete-time and hybrid architectures. For clarity of description in the sequel, attention is focused on the hybrid architecture that is well suited for 10 Gbps fiber-optic LANs.

The scope of the present invention applies to the "sign/sign" reduced-complexity variants of both the LMS and adaptive ZF algorithms. For clarity of description in the sequel, attention is focused on the adaptive ZF case, although the invention is equally applicable to the LMS algorithm with straightforward modifications.

We claim:

1. A zero-forcing (ZF) decision-feedback equalizer (DFE) comprising:
   a data section having an input to accept input data and an output to provide output data, the data section including a feedforward equalizer (FFE) data path, a DFE data path, and a data slicer;
   a control section including:
      a residual intersymbol interference (ISI) correlator having inputs to accept the output data and an error signal, the residual ISI correlator including a plurality of ZF correlators to form estimates of residual ISI estimates in the form of residual pre-cursor ISI coefficients and residual post-cursor ISI coefficients;
      an adaptive error slicer with an input to accept the residual ISI estimates and an output to supply a modified error signal to subtract residual ISI in response to the residual ISI estimates;
   wherein the FFE correlator accepts the modified error signal to subtract residual ISI, and uses a "sign/sign" algorithm to update FFE tap weights; and,
   wherein the DFE correlator accepts the modified error signal to subtract residual ISI, and uses a "sign/sign" algorithm to update DFE tap weights.

2. The ZF DFE of claim 1 wherein the control section further comprises:
   an FFE correlator having an input to accept the output data and error signal, and an output to supply FFE tap weights;
   a DFE correlator having an input to accept the output data and error signals, and an output to supply DFE tap weights;
   wherein the FFE data path has inputs to accept the input data and FFE tap weights, and an output to supply data with pre-cursor ISI removed in response to the FFE tap weights; and,
   wherein the DFE data path has inputs to accept the output data and DFE tap weights, and an output to supply data with post-cursor ISI removed in response to the DFE tap weights.

3. The ZF DFE of claim 1 wherein the data section has a channel impulse response spanning a first number of symbols, greater than a sum of a second and third number of symbols;
   wherein the FFE data path spans the second number of symbols;
   wherein the DFE spans the third number of symbols; and,
   wherein the residual ISI correlator supplies greater than the second number of residual pre-cursor ISI coefficients, and supplies greater than the third number of residual post-cursor ISI coefficients.

4. The ZF DFE of claim 1 wherein the residual ISI correlator includes:
   a first bank of ZF correlators, each correlator having an input to accept an error signal and a corresponding delayed data signal, and an output to supply a corresponding residual pre-cursor ISI coefficient; and,
   a second bank of ZF correlators, each correlator having an input to accept an error signal and a corresponding delayed data signal, and an output to supply a corresponding residual post-cursor ISI coefficient.

5. The ZF DFE of claim 1 wherein the adaptive error slicer accepts a sequence of M output data symbols, where M is a variable integer, generates $2^M$ possible data sequences, multiplies each residual pre-cursor ISI coefficient by a corresponding symbol in each data sequence, multiplies each residual post-cursor ISI coefficient by a corresponding symbol in each data sequence, sums the products of each sequence, and selects the error signal from the $2^M$ sums matching the accepted sequence of M data symbols.

6. The ZF DFE of claim 5 wherein the data section accepts an input signal having a data rate;
   wherein the adaptive error slicer sums the products of each sequence in parallel; and,
   wherein the FFE and DFE correlators use the "sign/sign" algorithm to update FFE and DFE tap weights, respectively, at the data rate.

7. The ZF DFE of claim 1 wherein the adaptive error slicer is a serial adaptive error slicer accepting a sequence of M output data symbols, where M is a variable integer, selecting a data sequence from $2^M$ possible sequences, multiplying each residual pre-cursor ISI coefficient by a corresponding symbol in the selected data sequence, multiplying each residual post-cursor ISI coefficient by a corresponding symbol in the selected data sequence, summing the products of the selected sequence to create a possible error signal, comparing the possible error signal to the accepted sequence of M output data symbols, and repeating the selection of data sequences until a match is found.

8. A zero-forcing (ZF) decision-feedback equalizer (DFE) comprising:
a data section having an input to accept input data and an output to provide output data, and a channel impulse response spanning a first number of symbols, greater than a sum of a second and third number of symbols, the data section including a feedforward equalizer (FFE) data path spanning the second number of symbols, a DFE data path spanning the third number of symbols, and a data slicer;
a control section including:
a residual intersymbol interference (ISI) correlator having inputs to accept the output data and an error signal, the residual ISI correlator including a plurality of ZF correlators to form estimates of residual ISI estimates in the form of residual pre-cursor ISI coefficients and residual post-cursor ISI coefficients, the residual ISI correlator supplying a greater than the second number of residual pre-cursor ISI coefficients, and supplying a greater than the third number of residual post-cursor ISI coefficients; and,
an adaptive error slicer with an input to accept residual ISI estimates and an output to supply the modified error signal to subtract residual ISI in response to the residual ISI estimates.

9. The ZF DFE of claim 8 wherein the control section further comprises:
an FFE correlator having an input to accept the output data and error signal, and an output to supply FFE tap weights;
a DFE correlator having an input to accept the output data and error signals, and an output to supply DFE tap weights;
wherein the FFE data path has inputs to accept the input data and FFE tap weights, and an output to supply data with pre-cursor ISI removed in response to the FFE tap weights; and,
wherein the DFE data path has inputs to accept the output data and DFE tap weights, and an output to supply data with post-cursor ISI removed in response to the DFE tap weights.

10. The ZF DFE of claim 8 wherein the FFE correlator accepts the error signal that has been modified to subtract residual ISI, and uses a "sign/sign" algorithm to update FFE tap weights; and,
wherein the DFE correlator accepts the error signal that has been modified to subtract residual ISI, and uses a "sign/sign" algorithm to update DFE tap weights.

11. The ZF DFE of claim 8 wherein the residual ISI correlator includes:
a first bank of ZF correlators, each correlator having an input to accept an error signal and a corresponding delayed data signal, and an output to supply a corresponding residual pre-cursor ISI coefficient; and,
a second bank of ZF correlators, each correlator having an input to accept an error signal and a corresponding delayed data signal, and an output to supply a corresponding residual post-cursor ISI coefficient.

12. The ZF DFE of claim 10 wherein the adaptive error slicer accepts a sequence of M output data symbols, where M is a variable integer, generates $2^M$ possible data sequences, multiplies each residual pre-cursor ISI coefficient by a corresponding symbol in each data sequence, multiplies each residual post-cursor ISI coefficient by a corresponding symbol in each data sequence, sums the products of each sequence, and selects the error signal from the $2^M$ sums matching the accepted sequence of M data symbols.

13. The ZF DFE of claim 12 wherein the data section accepts an input signal having a data rate;
wherein the adaptive error slicer sums the products of each sequence in parallel; and,
wherein the FFE and DFE correlators use the "sign/sign" algorithm to update FFE and DFE tap weights, respectively, at the data rate.

14. The ZF DFE of claim 10 wherein the adaptive error slicer is a serial adaptive error slicer accepting a sequence of M output data symbols, where M is a variable integer, selecting a data sequence from $2^M$ possible sequences, multiplying each residual pre-cursor ISI coefficient by a corresponding symbol in the selected data sequence, multiplying each residual post-cursor ISI coefficient by a corresponding symbol in the selected data sequence, summing the products of the selected sequence to create a possible error signal, comparing the possible error signal to the accepted sequence of M output data symbols, and repeating the selection of data sequences until a match is found.

15. A zero-forcing (ZF) decision-feedback equalizer (DFE) comprising:
a data section having an input to accept input data and an output to provide output data, the data section including a feedforward equalizer (FFE) data path, a DFE data path, and a data slicer;
a control section including:
a residual intersymbol interference (ISI) correlator having inputs to accept the output data and an error signal, the residual ISI correlator including a plurality of ZF correlators to form estimates of residual ISI estimates in the form of residual pre-cursor ISI coefficients and residual post-cursor ISI coefficients;
an adaptive error slicer with an input to accept the residual ISI estimates and an output to supply a modified error signal to subtract residual ISI in response to the residual ISI estimates;
wherein the residual ISI correlator includes:
a first bank of ZF correlators, each correlator having an input to accept an error signal and a corresponding delayed data signal, and an output to supply a corresponding residual pre-cursor ISI coefficient; and,
a second bank of ZF correlators, each correlator having an input to accept an error signal and a corresponding delayed data signal, and an output to supply a corresponding residual post-cursor ISI coefficient.

16. The ZF DFE of claim 15 wherein the control section further comprises:
an FFE correlator having an input to accept the output data and error signal, and an output to supply FFE tap weights;
a DFE correlator having an input to accept the output data and error signals, and an output to supply DFE tap weights;
wherein the FFE data path has inputs to accept the input data and FFE tap weights, and an output to supply data with pre-cursor ISI removed in response to the FFE tap weights; and,
wherein the DFE data path has inputs to accept the output data and DFE tap weights, and an output to supply data with post-cursor ISI removed in response to the DFE tap weights.

17. The ZF DFE of claim 15 wherein the data section has a channel impulse response spanning a first number of symbols, greater than a sum of a second and third number of symbols;

wherein the FFE data path spans the second number of symbols;

wherein the DFE spans the third number of symbols; and, wherein the residual ISI correlator supplies greater than the second number of residual pre-cursor ISI coefficients, and supplies greater than the third number of residual post-cursor ISI coefficients.

18. The ZF DFE of claim 15 wherein the FFE correlator accepts the error signal that has been modified to subtract residual ISI, and uses a "sign/sign" algorithm to update FFE tap weights; and, wherein the DFE correlator accepts the error signal that has been modified to subtract residual ISI, and uses a "sign/sign" algorithm to update DFE tap weights.

19. The ZF DFE of claim 18 wherein the adaptive error slicer accepts a sequence of M output data symbols, where M is a variable integer, generates $2^M$ possible data sequences, multiplies each residual pre-cursor ISI coefficient by a corresponding symbol in each data sequence, multiplies each residual post-cursor ISI coefficient by a corresponding symbol in each data sequence, sums the products of each sequence, and selects the error signal from the $2^M$ sums matching the accepted sequence of M data symbols.

20. The ZF DFE of claim 18 wherein the adaptive error slicer is a serial adaptive error slicer accepting a sequence of M output data symbols, where M is a variable integer, selecting a data sequence from $2^M$ possible sequences, multiplying each residual pre-cursor ISI coefficient by a corresponding symbol in the selected data sequence, multiplying each residual post-cursor ISI coefficient by a corresponding symbol in the selected data sequence, summing the products of the selected sequence to create a possible error signal, comparing the possible error signal to the accepted sequence of M output data symbols, and repeating the selection of data sequences until a match is found.

* * * * *